United States Patent [19]
Cooper et al.

[11] Patent Number: 6,020,978
[45] Date of Patent: Feb. 1, 2000

[54] METHOD AND APPARATUS FOR COLOR HALFTONING USING INTERLOCKED THRESHOLD ARRAYS

[75] Inventors: Brian Edward Cooper; Shaun Timothy Love, both of Lexington, Ky.

[73] Assignee: Lexmark International, Inc., Lexington, Ky.

[21] Appl. No.: 08/940,526

[22] Filed: Sep. 30, 1997

[51] Int. Cl.$^7$ .......................... G06K 15/02; H04N 1/405
[52] U.S. Cl. ...................... 358/1.9; 358/535; 358/536; 358/457; 358/466; 382/237; 382/270
[58] Field of Search .................... 395/109, 108; 382/237, 270, 272; 358/534, 535, 298, 456, 457, 458, 466, 536

[56] References Cited

U.S. PATENT DOCUMENTS

| | | | |
|---|---|---|---|
| 5,111,310 | 5/1992 | Parker | 358/456 |
| 5,214,517 | 5/1993 | Sullivan et al. | 358/456 |
| 5,317,418 | 5/1994 | Lin | 358/456 |
| 5,673,121 | 9/1997 | Wang | 358/456 |
| 5,696,612 | 12/1997 | Thornton | 358/534 |
| 5,745,660 | 4/1998 | Kolpatzik et al. | 358/457 |
| 5,787,238 | 7/1998 | Wang | 358/1.9 |
| 5,812,744 | 9/1998 | Allebach et al. | 358/1.9 |
| 5,859,955 | 1/1999 | Wang | 358/1.9 |

OTHER PUBLICATIONS

M. Analoui and L.P. Allebach, "Model Based Halftoning Using Binary Search", Proc. of the SPIE, vol. 1666, pp. 96–108, Feb. 1992.
T.N. Pappas and D.L.Neuhoff, "Model–Based Halftoning", Proc. of the SPIE, vol. 1453, pp. 244–255, Feb. 1991.
T.N. Pappas and D.L. Neuhoff, "Least–Squares Model–Based Holftoning", Proc. of the SPIE, vol. 1666, pp. 165–176, Feb. 1992.
J. Sullivan, L. Ray and R. Miller, "Design of Minimum Visual Modulation Halftone Paterns", IEEE Transactions on Systems, Man. and Cybernetics, vol. 21, No. 1, pp. 33–38, Jan./Feb. 1991.
R.A. Ulichney, "The void–and–cluster method for dither array generation", Proc. of the SPIE, vol. 1913, pp. 332–343, Sep. 1993
M. Yao and K.J. Parker, "Modified Approach to the Construction of a Blue Noise Mask", Journal of Electronic Imaging, vol. 3, No. 1, pp. 92–97, Jan. 1994.

*Primary Examiner*—Scott Rogers
*Attorney, Agent, or Firm*—John J. McArdle, Jr.; Frederick H. Gribell, Esq.

[57] ABSTRACT

A dispersed-dot stochastic dither array is provided for rendering halftone images having excellent visual quality and are created by a minimum density variance method. By minimizing the variance in the number of dots within each local region of the image, a smooth and dispersed distribution of dots may be obtained. For color printing, a separate threshold array is generated for each of the color planes, however, the stochastic screens are interlocked so that the threshold arrays are generated while considering the other color threshold arrays. In this manner, a blue noise distribution may be produced by the individual arrays as well as by any combination of the individual arrays. When generating a single threshold array for a color plane, a particular criterion is used to determine where the next threshold value should be located, and the selection of a threshold location in each array considers the criterion for all the threshold arrays being generated. This may reduce the quality of an individual array by a small amount, but it allows for the combination of the arrays to have a significantly better distribution. The simplest approach uses the average of the criteria for all threshold arrays, however, to improve the quality of the individual arrays, the preferred method of the present invention uses a weighted average. When selecting a threshold location for an array "i" using weighted averages, the criterion associated with array i may be assigned a greater weight than each of the other individual arrays' criteria. By using the interlocked stochastic screens approach, the overall visual affect will be improved for both individual threshold arrays and for a combination of more than one of the threshold arrays. The interlocked approach is clearly superior for lighter shades, given any number of color planes.

26 Claims, 21 Drawing Sheets

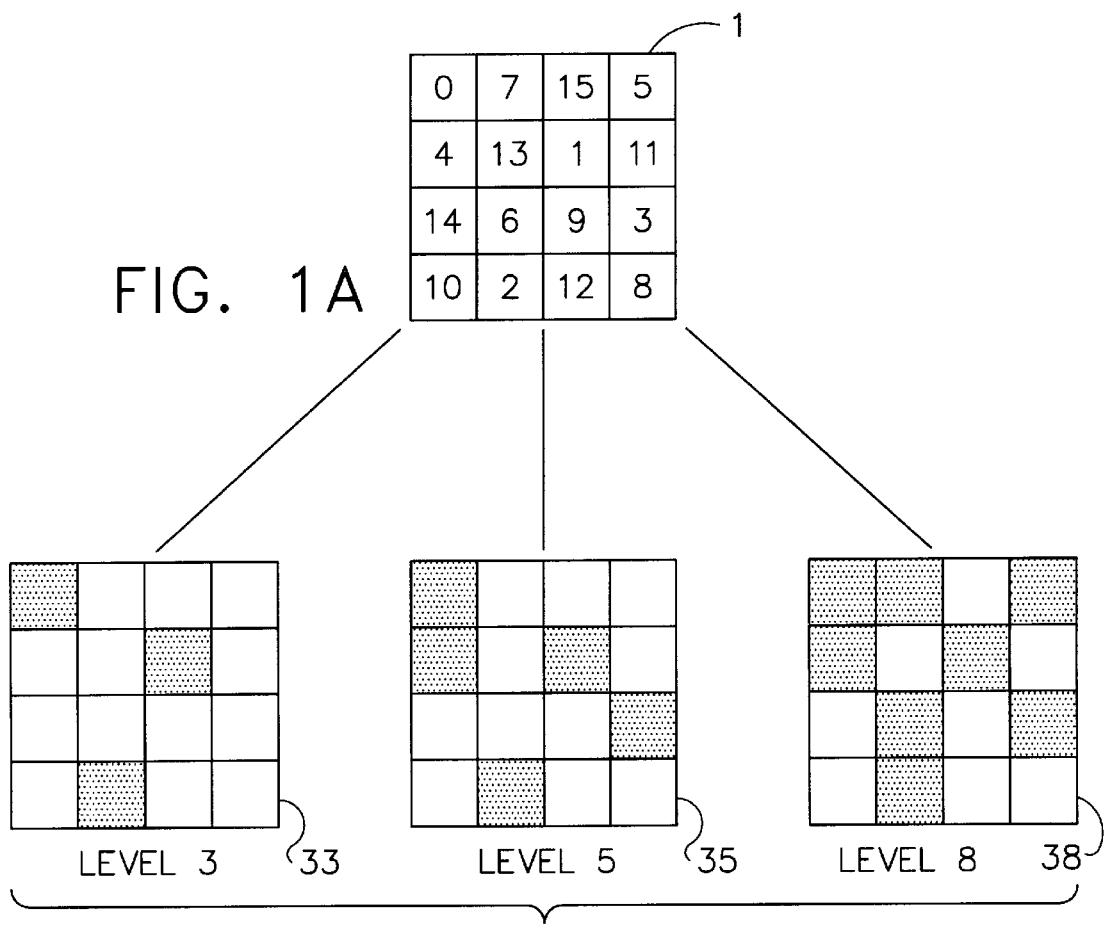
FIG. 1A
FIG. 1B
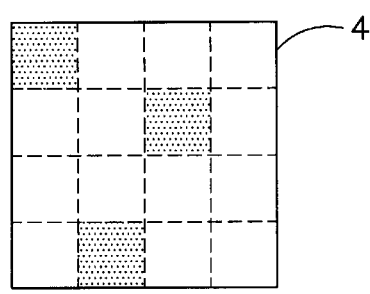
FIG. 2A

DENSITY ARRAY

DOT PROFILE

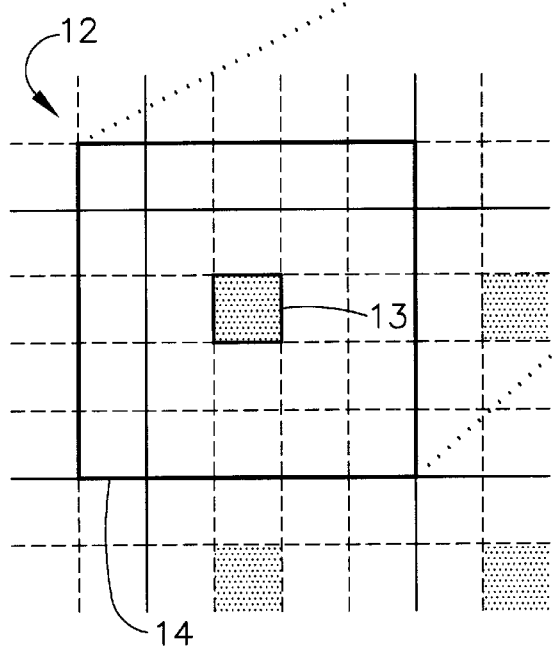
DENSITY ARRAY
FIG. 5A
DOT PROFILE
FIG. 5B
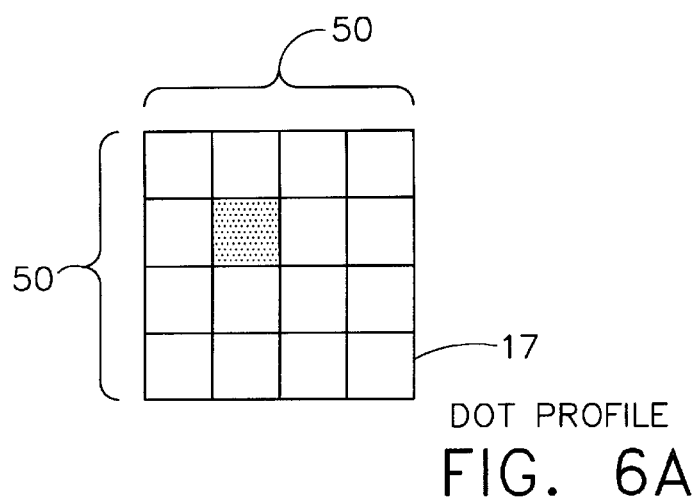
DOT PROFILE
FIG. 6A

DENSITY ARRAY

DOT PROFILE

DENSITY ARRAY

DENSITY SUM ARRAY

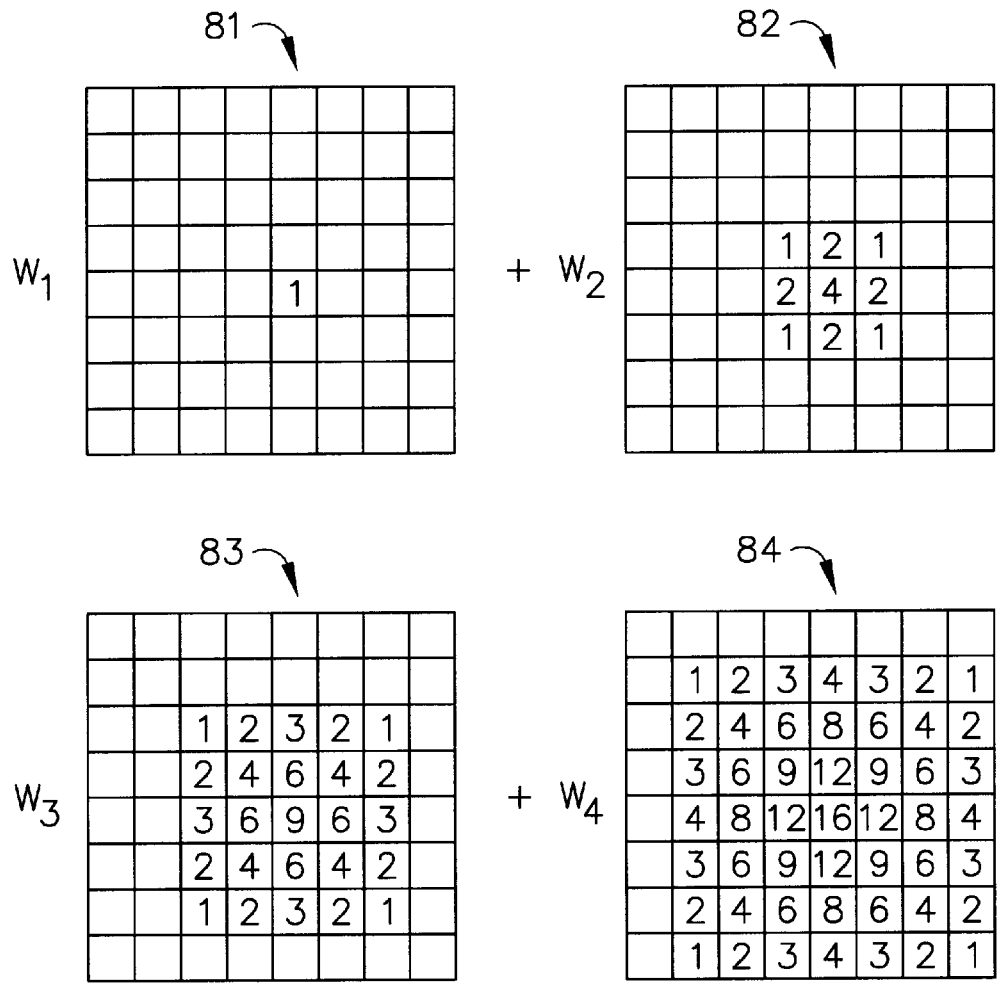
WITH WEIGHTS $W_1 = W_2 = W_3 = W_4 = 0.25$
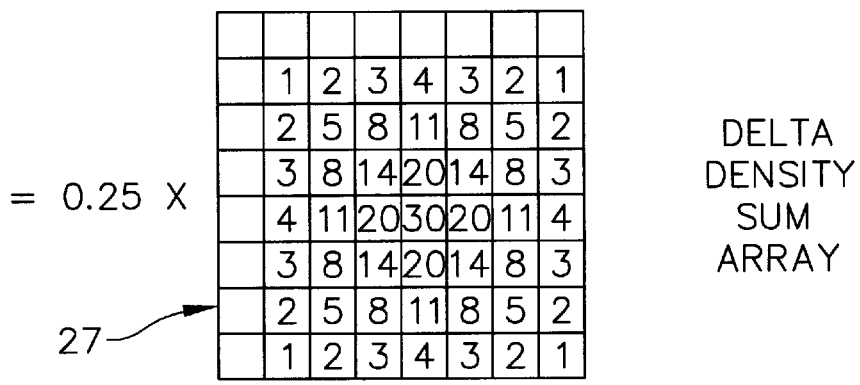
DELTA DENSITY SUM ARRAY
FIG. 8

FIG. 20

GAUSSIAN FILTER FUNCTION

| 1.0000 | 0.8007 | 0.4111 | 0.1353 | 0.0286 | 0.1353 | 0.4111 | 0.8007 |
| 0.8007 | 0.6412 | 0.3292 | 0.1084 | 0.0229 | 0.1084 | 0.3292 | 0.6412 |
| 0.4111 | 0.3292 | 0.1690 | 0.0556 | 0.0117 | 0.0556 | 0.1690 | 0.3292 |
| 0.1353 | 0.1084 | 0.0556 | 0.0183 | 0.0039 | 0.0183 | 0.0556 | 0.1084 |
| 0.0286 | 0.0229 | 0.0117 | 0.0039 | 0.0008 | 0.0039 | 0.0117 | 0.0229 |
| 0.1353 | 0.1084 | 0.0556 | 0.0183 | 0.0039 | 0.0183 | 0.0556 | 0.1084 |
| 0.4111 | 0.3292 | 0.1690 | 0.0556 | 0.0117 | 0.0556 | 0.1690 | 0.3292 |
| 0.8007 | 0.6412 | 0.3292 | 0.1084 | 0.0229 | 0.1084 | 0.3292 | 0.6412 |

FIG. 21

FILTERED ARRAY 1

| 0.0412 | 0.0674 | 0.1122 | 0.1362 | 0.1122 | 0.0674 | 0.0412 | 0.0324 |
| 0.1640 | 0.2247 | 0.3475 | 0.4150 | 0.3475 | 0.2247 | 0.1640 | 0.1471 |
| 0.4376 | 0.4982 | 0.6968 | 0.8125 | 0.6968 | 0.4982 | 0.4376 | 0.4340 |
| 0.7765 | 0.7403 | 0.9091 | 1.0229 | 0.9091 | 0.7403 | 0.7765 | 0.8293 |
| 0.9091 | 0.7403 | 0.7765 | 0.8293 | 0.7765 | 0.7403 | 0.9091 | 1.0229 |
| 0.6968 | 0.4982 | 0.4376 | 0.4340 | 0.4376 | 0.4982 | 0.6968 | 0.8125 |
| 0.3475 | 0.2247 | 0.1640 | 0.1471 | 0.1640 | 0.2247 | 0.3475 | 0.4150 |
| 0.1122 | 0.0674 | 0.0412 | 0.0324 | 0.0412 | 0.0674 | 0.1122 | 0.1362 |

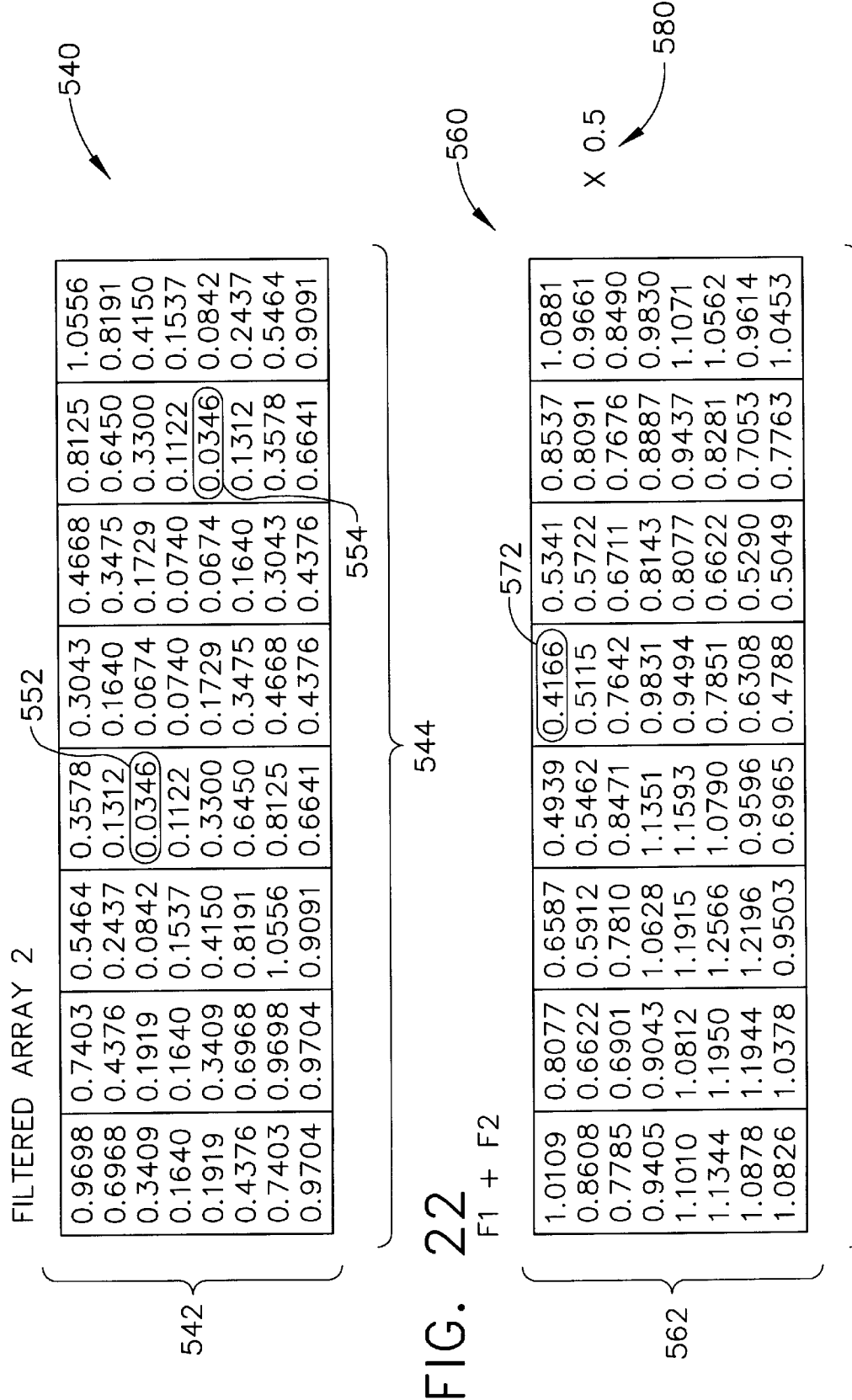

METHOD AND APPARATUS FOR COLOR HALFTONING USING INTERLOCKED THRESHOLD ARRAYS

TECHNICAL FIELD

The present invention relates generally to a method for halftoning digital color images and is particularly directed to the use of a dispersed-dot stochastic dither array and a statistical approach called the minimum density variance method, with interlocked threshold arrays. The invention is specifically disclosed in which halftone images are rendered using a dither matrix representing correlated dot patterns, where the dots of each dot pattern are arranged to minimize a function of the variances in the number of dots per region across an appropriate range of region sizes, and in which each color plane threshold array is generated while considering the threshold arrays for all of the other color planes, rather than independently generating each color plane threshold array.

BACKGROUND OF THE INVENTION

Halftoning describes the process of displaying an image on a device which is capable of representing only a finite, discrete number of tone levels. The position and arrangement of the discrete picture elements should create the illusion of a continuous-tone image. Using the traditional halftoning techniques of clustered-dot ordered dither and dispersed-dot ordered dither, undesirable visual patterns often appear, caused by the fact that the dots are placed along a distinct, rectangular (or sometimes hexagonal) grid. For colored images, there is the additional disadvantage of moire patterns, resulting from the interaction of the spatial frequencies of the halftone patterns of the individual primary colors.

To overcome some of these difficulties, halftoning methods which incorporate randomness have been developed to eliminate the distinctly periodic patterns of ordered dither. In addition, colored images rendered with random dither are free of moire patterns. The earliest attempts to incorporate randomness used white noise, in which all spatial frequencies were represented equally. Although images rendered with white noise dither are free of periodic artifacts, the images nevertheless looked too grainy, which is caused by the presence of low spatial frequencies in the halftone pattern. If the low frequency or "pink noise" content of the signal is eliminated, the remaining "blue noise" retains only higher spatial frequencies. In a book titled *Digital Halftoning*, by R. A. Ulichney, it was disclosed that images rendered with blue noise dither possess sharp detail and are free of the visual artifacts of ordered dither.

Blue noise, or more generally, dispersed-dot stochastic halftoning offers superior visual quality. The earliest blue noise method, error diffusion, considers the quantization error in neighboring pixels when deciding how to quantize the current pixel. Other techniques incorporate models of the printing device's physical behavior, or human visual perception, or a combination of both considerations. Examples of these other techniques include the minimum visual modulation approach described in an article titled *Design of Minimum Visual Modulation Halftone Patterns*, by J. Sullivan, L. Ray, and R. Miller; modified error diffusion, disclosed in an article titled *Model-Based Halftoning*, by T. N. Pappas and D. L. Neuhoff; least-squares model-based halftoning, disclosed in an article titled *Least-Square Model-Based Halftoning*, by T. N. Pappas and D. L. Neuhoff; and direct binary search, disclosed in an article titled *Model-based Halftoning Using Direct Binary Search*, by M. Analoui and J. P. Allebach.

The minimum visual modulation approach described by Sullivan et al. builds a set of 256 binary images (one for each gray level) by optimizing each binary image according to a human visual modulation transfer function. The minimization technique of simulated annealing leads toward an optimal solution, however, the computational costs of each comparison is expensive, requiring a Fourier transform of each potential dot profile. The advantage is that, once this set has been generated, an image may be rendered quickly by simply matching each gray level to the appropriate binary image. The other conventional techniques offer better quality, but all rely upon image-dependent feedback, and require substantially more computation when rendering the image.

Halftoning using a dither array sacrifices some of the qualities of the image-dependent model-based approaches, but offers considerably greater speed when rendering the image. A dither array is a two-dimensional arrangement of numbers used to produce a halftone pattern. In typical applications, the numbers will be integers in the range from zero (0) through two hundred and fifty-five (255), inclusive. To produce a halftone pattern for a gray level "g" in the range of $0 \leq g \leq 255$, every location in the dither array $<g$ will be marked with a dot. Each resulting "dot profile" (i.e., a binary image representing a constant gray level) must necessarily be a subset of all darker dot profiles. Typically, a dither array is created one dot profile at a time.

It is usually impractical to create a dither array as large as the image which is to be rendered. Therefore, the dither array typically is "tiled," or repeated periodically, as many times as needed to cover the image. Accordingly, the dither array must be free of any visual artifacts which would result in periodic patterns. The primary advantage of a dither array is its speed, which is due to the fact that for each pixel in the image, it is necessary to check only a single threshold value in the dither array.

An early dispersed-dot stochastic dither array was an adaptation of Sullivan's minimum visual modulation approach. By imposing the additional constraint that the bit patterns be "correlated" with one another, a dither array could be generated instead of using a set of 256 uncorrelated bit patterns (i.e., dot profiles). This conventional correlation approach was described in U.S. Pat. No. 5,214,517, by Sullivan et al.

A later patent, U.S. Pat. No. 5,111,310, by Parker et al. discloses the use of a blue noise mask. The Parker blue noise mask builds successive levels of the dither array by filtering the Fourier transform of each dot profile with a blue noise frequency distribution. The filtered dot profile is compared against the original dot profile to determine where dots should be added or removed, in order to create the next level (either higher or lower in gray scale level). Ulichney's void-and-cluster algorithm, disclosed in an article titled The Void-And-Cluster Method for Dither Array Generation, by R. A. Ulichney provides a fast, simple algorithm for generating a blue noise dither array, based upon the spatial distances between the pixels in each dot profile. Although this method is quick, its quality falls short of the optimal solution. Improvements have been made to both the blue noise mask and the void-and-cluster algorithm, discussed in an article titled Modified Approach to the Construction of the Blue Noise Mask, by M. Yao and K. J. Parker, and a patent titled Halftone Images Using Special Filters, U.S. Pat. No. 5,317,418, by Qian Lin. Both of these conventional approaches are presently susceptible to local minima, as they are based upon greedy optimization techniques.

Stochastic screening combines the high quality of error diffusion with the high speed of screening by use of a threshold array. For color printing, stochastic screens may be used for each color plane. In some situations, each color plane must be rendered individually, without any knowledge of the other color planes. In one example, a "dot-on-dot" method uses the same threshold array for each color plane. Another example is a "shifting" method which shifts the threshold array by a different offset distance for each color plane. Another method called "fixed partitioning" divides (i.e., partitions) the threshold range into "N" equally sized subranges, which are then used as the lightest set of subranges for each of the N planes.

When multiple color planes are combined together (i.e., superimposed or superpositioned), the individual stochastic screens should interact with each other so that the combination of dots from more than one plane should still produce a blue noise distribution. While any method of stochastic screening may be extended to color printing, the various methods used in the past each have their advantages and disadvantages. For example, the dot-on-dot method is sensitive to registration error and it fails to spread out the dots from multiple planes, which gives unnecessarily low spatial frequencies among the lighter tones. However, if dot placement is sufficiently consistent, and registration between color planes is sufficiently good, the dot-on-dot approach can also give reliable color consistency.

Another simple approach is to shift the threshold array by some horizontal and vertical offset for each of the color planes. Typically, the offsets for different planes will be mutually prime numbers (i.e., sharing no common divisors) to avoid the potential for periodic artifacts. The shifting method spreads out the dots for multiple color planes, but the resultant combination of dots contains too much white noise.

If there are only two color planes, the threshold array may be negated or inverted for the second color plane. For each threshold "t" in the original threshold array, the threshold at the same location in the second array will be the quantity "255−t" (assuming that the threshold array values are in the range of 0–255). Thus, the lightest thresholds in one array will become the darkest thresholds in the negated array and vice versa. One color will use the original array and the other color will use the negated array, and the two colors will overlap one another only when there is more than 100% total coverage. In a paper titled, *"Color Halftoning With Blue Noise Masks,"* by M. Yao and K. G. Parker, the negating method is generalized for three or more color planes. For lighter shades, the negating method appears just as noisy as the shifting method. In general, the lightest thresholds tend to be located near the darkest thresholds in a given threshold array. In the negated array, the darkest thresholds will become the lightest thresholds. Thus, the lightest thresholds of the original array will tend to be located near the lightest thresholds in the negated array, and the pattern formed by the superposition of the two threshold arrays will appear noisy, at least in the lighter shades.

This problem will be most prominent when the lighter tones of individual color planes are combined together. For darker shades, the quality will steadily improve for two reasons: (1) the greater the separation between a threshold and its negated value, the less likely the two thresholds, together, form a pleasing pattern, although this aspect becomes least prominent for thresholds that are in the center of the intensity range; and (2) as more dots are added to the pattern, the spatial frequency increases, and the noise becomes more difficult to discern, although this aspect becomes least prominent when there is complete saturation.

As related above, both the shifting method and the negating method perform poorly for light shades, however, as the shades become darker, the negating method improves in quality compared to the shifting method. See U.S. Pat. No. 5,341,228, by Parker and Mitsa for further information.

The above-referenced Yao and Parker article suggests that dividing the range of threshold values among each of the color planes could be utilized in a fixed partitioning scheme. While the fixed partitioning method does a better job than the shifting method for color combinations that are near 100% total coverage, for lighter shades the fixed partitioning method appears just as noisy as the shifting method.

All of the methods described above for stochastic screening in color allow for each color plane to be rendered independently of the other color planes. In some cases, this restriction facilitates the overall design. However, the lighter shades are generally too noisy when combining the color planes. It would be advantageous to provide a new method of color halftoning with stochastic screens in which each of the individual stochastic screens is designed so that all of the screens may fit together to produce a combined pattern of dots that has a blue noise distribution, thereby presenting a pleasing result when combining all of the color planes.

SUMMARY OF THE INVENTION

Accordingly, it is a primary object of the present invention to eliminate visual patterns that arise from variations in dot density of dot profiles used in halftoning of digital images.

It is a further object of the present invention to reduce the "cost function," which is the statistical variance of the dot density of dot profiles used in halftoning of digital images, thereby eliminating visual patterns while giving uniform density that does not contain objectionable visual artifacts.

It is another primary object of the present invention to provide "interlocked" stochastic screens used in color halftoning so that the individual screens may fit together to produce a blue noise distribution of dots in the combined color pattern.

It is yet a further object of the present invention to provide interlocked stochastic screens used for color halftoning which can be used with as many individual color planes as desired, or which can be used with as few as two color planes.

It is still a further object of the present invention to provide a method of color halftoning that uses interlocked stochastic screens for each of the color planes in which each individual color plane produces a visually pleasing blue noise distribution, and in which the individual stochastic screens interact with one another so that the combination of dots from more than one plane still produces a visually pleasing blue noise distribution.

It is yet another object of the present invention to provide a method of color halftoning using stochastic screens to produce individual color planes that fit together to produce a combined pattern of dots that have a visually pleasing blue noise distribution, but that are not particularly sensitive to registration error.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved method for generating a dispersed-dot stochastic dither array used in halftoning is provided using minimum density variance. By minimizing the variation in the distribution of dots in a given dot profile, a pleasing dot profile may be obtained. A dot profile array for a particular gray level is first created, and then a corresponding delta density sum array is created. At each location where the dot profile is equal to one (1), the delta density sum array is shifted so as to be centered at that location. The delta density sum array is added to an initially cleared cumulative density sum array for each location where the dot profile is equal to one (1). The available set of dot locations is then determined, and a pre-determined number of these dot locations is randomly selected as required to create the next gray level. If the next level to be created is an increase in gray level, then the available set of dot locations comprises those locations in the array that have no dot. If the next level to be created is a lower gray level, then the available set of dot locations comprises those locations that already contain a dot.

The randomly selected dot locations will have dots added if the next gray level is to be an increase, or those same randomly selected locations will have dots removed if the next level is to be a decrease in gray level. If increasing one gray level, the delta density sum array is shifted for each of the randomly selected positions to be centered at the randomly selected position, then added to the cumulative density sum array. If decreasing one gray level, the delta density sum array is shifted for each of the randomly selected positions to be centered at the randomly selected position, then subtracted from the cumulative density sum array. The final step is to minimize the variance of the density of the dot profile, using a technique known as "simulated annealing." It will be understood that the "next" gray level to be generated does not necessarily have to be a single level up or down.

Simulated annealing is used to find a dot profile which is nearly optimal with respect to a weighting function based upon the local density variances, and this may be extended to obtain a dither array. Each step of the simulated annealing exchanges the values at a previously selected location and a previously unselected available location in the dot profile. This movement of dots is repeated many times, during which process the variance of the density of the dot profile is calculated to see if each dot movement is an improvement or not. Improvement is part of the criteria for accepting the movement, thus as this iterative process is performed, the variance of the density will gradually decrease, until it has become sufficiently minimized. No Fourier transformations are required using the method of the present invention, and consequently, considerably less computation is needed as compared to some conventional methods.

For color printing, a separate threshold array is generated for each of the color planes. The method provided by the present invention interlocks the stochastic screens so that the threshold arrays are generated while considering the other color threshold arrays. Each individual threshold array is thereby "interlocked" with the other threshold arrays, so that a blue noise distribution may be produced by the individual arrays as well as by any combination of the individual arrays. The interlocking method of the present invention applies to any algorithm for generating a stochastic screen, including the minimum density variance method, related above, the void and cluster algorithm, a frequency-based blue noise mask generation, and modeling based on the human visual modulation transfer function (MTF).

When generating a single threshold array using the method of the present invention, a particular criterion is used to determine where the next threshold value should be located. When using the minimum density variance method, the location is chosen so that the overall variance in the number of dots is minimized across a range of region sizes. For the void and cluster algorithm, the chosen location is either the largest void or largest cluster. For frequency-based methods, the location is chosen such that the frequency distribution of the new pattern matches a desired spectrum, such as blue noise or the human visual MTF.

The interlocking method of the present invention generates a set of threshold arrays simultaneously, and the selection of a threshold location in each array considers the criterion for all the threshold arrays being generated. For example, when using the void and cluster algorithm, the array location for a given threshold array will consider the locations of voids and clusters in all of the threshold arrays. This may reduce the quality of an individual array by a small amount, but it allows for the combination of the arrays to have a significantly better distribution. The simplest approach uses the average of the criteria for all threshold arrays. Although this simple approach tends to give better results for the combination of arrays, the quality of the individual arrays may be unacceptable.

Instead of treating each color plane separately, the interlocking method generates a combined set of threshold arrays. For each threshold value "t," a set of locations will be chosen in each of the threshold arrays before progressing to the next threshold value. The selection of a location for threshold t in one array considers the criterion for all the threshold arrays. For example, with the minimum density variance method, the threshold location for a given array depends not only upon the dot density variance for its own dot pattern, but upon the dot density variance for the dot patterns of all the other threshold arrays as well. The threshold array location thereby could be chosen to minimize the average dot density variance for all of the threshold arrays, which may reduce the quality of an individual array by a small amount, but allows for the combination of the arrays to have a significantly better distribution.

To improve the quality of the individual arrays, the preferred method of the present invention uses a weighted average. When selecting a threshold location for an array "i" using weighted averages, the criterion associated with array i may be assigned a greater weight than each of the other individual arrays' criteria. For example, a threshold array's own criterion could be weighted two (2) or three (3) times as much as the criterion for any other individual array. By using the interlocked stochastic screens approach, the overall visual affect will be improved for both individual threshold arrays and for a combination of more than one of the threshold arrays. The interlocked approach is clearly superior for lighter shades, given any number of color planes.

When generating threshold arrays for four-color (CMYK) printing, the yellow plane can often be excluded while generating the interlocked stochastic threshold arrays, since the yellow dots are so light that any artifacts in the yellow plane are extremely difficult to see. Therefore, black, magenta, and cyan are preferably assigned to each of three interlocked threshold arrays. Likewise, for three-color (CMY) printing, yellow can again be excluded while generating a set of two (2) interlocked threshold arrays. In this instance, an interlocked threshold array is generated for each of the colors magenta and cyan. In general, however, a set of "P" interlocked threshold arrays may be generated where there are at least N distinct color planes. In other words, a yellow plane can be included for either CMYK or CMY printing, resulting in a set of four (4) interlocked threshold arrays and three (3) interlocked threshold arrays, respectively.

If the color yellow is ignored, then the number of interlocked threshold arrays can be reduced, which also reduces constraints and that now allows better visual quality to be produced. Naturally, a yellow plane ultimately will need to be produced for color printing, however, it will not need to be interlocked with the threshold arrays of the other color planes. Therefore, the color plane can be generated by any method, which preferably will be the minimum density variance method, described hereinabove.

The quality of a set of three interlocked arrays visually looks even better when all three planes are combined, as compared to a combination on only two of the three planes. This should not be surprising, since the interlocked arrays are generated from a weighted set of criteria from all three planes. Even for darker shades, the interlocked arrays appear to offer quality comparable to fixed partitioning. The interlocking arrays method is thereby clearly superior to the previously known methods of generating color planes since it offers visually pleasing results at both light intensities and dark intensities. When generating the set of "P" interlocked stochastic threshold arrays, one for each of "P" color planes, an array of P dot profiles DP[i] are used, each of a size M×N. A variable named "dotsneeded[i]" is the number of dots needed for a dot profile DP[i] to reach the desired tone level. The method uses a variable "CTN[i]" which is initially set to zero (0) for all values of "i." If the value for CTN[i] is less than the value "dotsneeded[i]" for a particular plane i, then a color plane i will be selected such that a number of "newdots" will be added to {or removed from} the dot profile DP[i], such that the number of "newdots" is at least one (1) and the quantity "newdots+CTN[i]" does not exceed the value of the variable dotsneeded[i].

At this point, the value "newdots" is added to the quantity CTN[i]. Using a particular criterion to determine the physical array location of the "newdots" that are to be added to or subtracted from an individual stochastic threshold array, a function is performed which combines the criteria for all planes P. Once this function is performed to determine the proper locations to either add {or remove} the "newdots", then the correct number of dots (i.e., the value of "newdots") is added to {or removed from} the dot profile DP[i] for that plane i.

The locations in the threshold array for plane i are now marked such that these locations correspond to array locations at which dots were added to {or removed from} the dot profile DP[i]. The value of the variable CTN[i] is now evaluated again to see if it is less than the value "dotsneeded [i]." If the answer remains YES, then an additional amount of "newdots" will be added to {or removed from} this dot profile. If the result is NO, then this particular dot profile has been completed.

As related above, the criterion used to determine the location of the "newdots" for each individual stochastic threshold array can be any of a number of criteria known in the prior art, however, the preferred criterion is the minimum density variance method related hereinabove. Regardless of the precise criterion used, as long as the function combines all of the criteria for all of the planes "P," then the individual threshold arrays will be interlocked, according to the principles of the present invention.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 1A shows a 4×4 dither (or "threshold") array.

FIG. 1B shows three correlated dot profiles at three different gray levels.

FIG. 2A shows an example dot profile.

FIG. 5A shows a density array as it is affected by one dot location.

FIG. 5B shows a tiled dot profile containing a single dot which is used in creating the density array of FIG. 5A.

FIG. 6A shows a non-tiled dot profile containing a single dot.

FIG. 8 shows the formation of the delta density sum array based on density sum arrays for different region sizes.

FIG. 20 shows a Gaussian filter function used in an 8×8 array, which is to be applied to the bitmaps of FIGS. 13 and 14.

FIG. 21 is an 8×8 filtered array representative of Bitmap #1 after the Gaussian filter has been applied.

FIG. 22 is an 8×8 filtered array representative of Bitmap #2 after the Gaussian filter has been applied.

FIG. 23 is an 8×8 interlocked filtered array representative of the filtered arrays of FIGS. 21 and 22, with equal weighting applied.

DETAILED DESCRIPTION OF THE PREFERRED EMBODIMENT

Figure 2B:
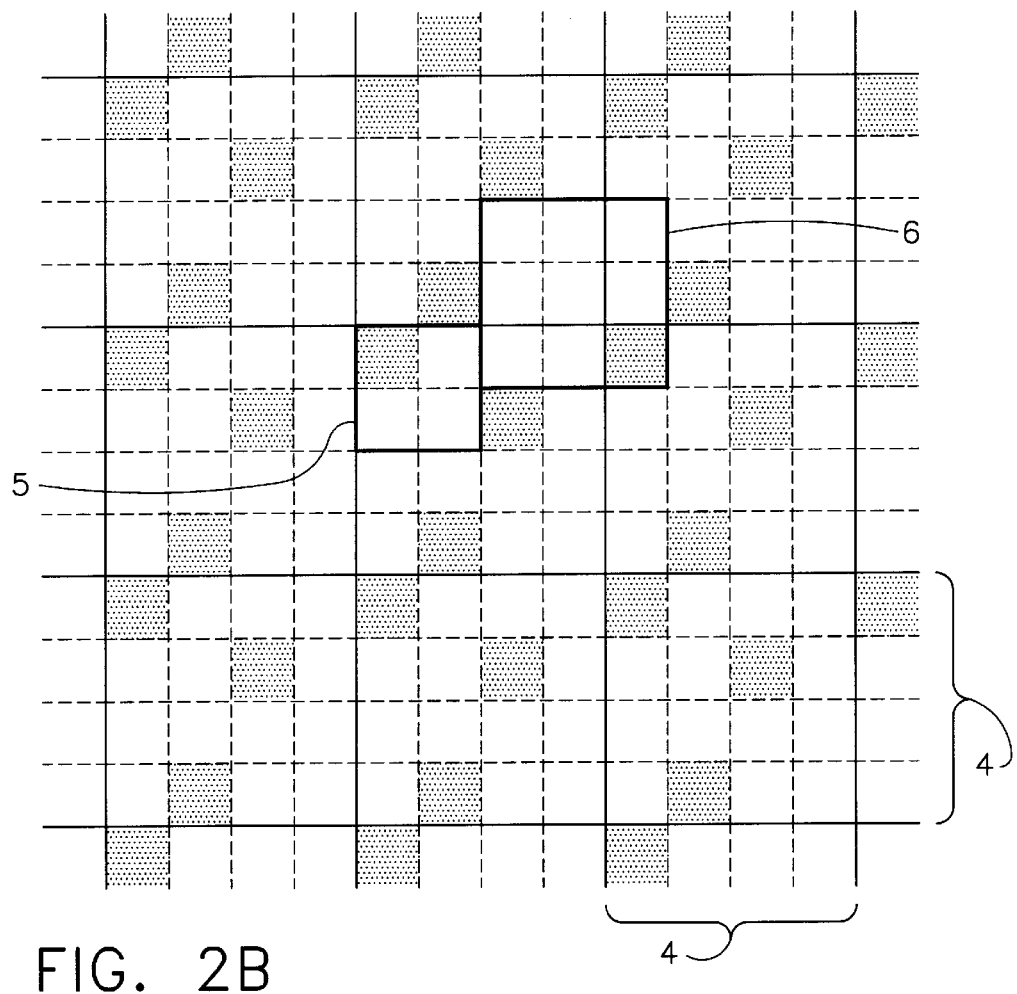
FIG. 2B shows the dot profile of FIG. 2A showing various sample size density measurements.

Reference will now be made in detail to the present preferred embodiment of the invention, an example of which is illustrated in the accompanying drawings, wherein like numerals indicate the same elements throughout the views.

The present invention provides a method for generating a halftone image from a gray scale image using a dither array. The preferred dither array used is a dispersed-dot stochastic dither array, and the halftone image is generated in an efficient manner from the gray scale image by performing a direct comparison of pixel values in the gray scale image to values in corresponding positions of the dither array. The dither array is generated from a set of dot profiles, which are correlated with one another such that all of the dots in a given dot profile are present in all subsequent dot profiles (i.e., at higher gray levels).

Referring now to the drawings, FIG. 1A shows an example of a 4×4 dither array, generally designated by the index numeral 1, and having numeric values in the range of zero (0) through fifteen (15), inclusive. FIG. 1B shows a collection of three of the different dot profiles at three different gray level values used to generate the dither array of FIG. 1A. The dot profile having the index numeral 33 corresponds to a gray level of three (3), which contains three dots out of the sixteen possible locations in the 4×4 dot profile. The dot profile 35 corresponds to a gray level of five (5), and the dot profile 38 corresponds to a gray level of eight (8).

FIG. 2A shows a dot profile designated by the index numeral 4 of size M×N (where M and N both equal 4), which has been tiled repeatedly in FIG. 2B. In FIG. 2B, each tile 4 can be seen bounded by the solid horizontal and vertical lines, and as designated by the brackets corresponding to the index numeral 4. Region 5 is one of M*N different regions of size 2×2 into which the dot profile is subdivided. Region 6 is one of M*N regions of size 3×3. When a region extends beyond the boundary of the M×N array, it wraps around to the opposite side, thus achieving a periodic tiling. In practice, this "wrap-around" may be accomplished by addressing the array elements modulo the array size. In general, the dot profile may be subdivided into M*N different regions of constant size. For all such regions, the number of dots contained within a particular region [m,n] can be counted and used as a measure of dot density at that location.

In the following example, X[m,n] represents the number of dots found in region [m,n]. For the dots to be uniformly distributed across the entire dot profile, the variance of the number of dots in each of the different regions of the dot profile should be as low as possible. The term "variance" is equal to the square of the standard deviation. It is possible for an image to produce a minimal variance and still contain periodic patterns matching the period of the region's size. Therefore, a range of region sizes should be examined when creating a dither array.

Figure 3A:
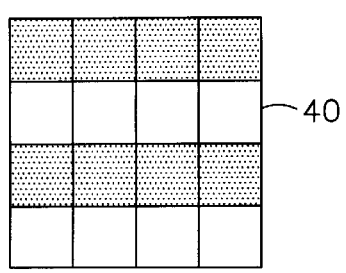
FIGS. 3A, 3B, and 3C show three different 4×4 dot profiles having similar densities.
Figure 3B:
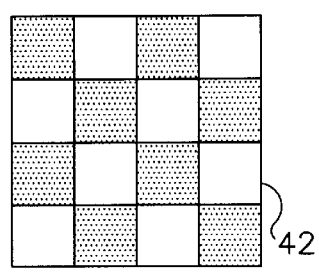
Figure 3C:
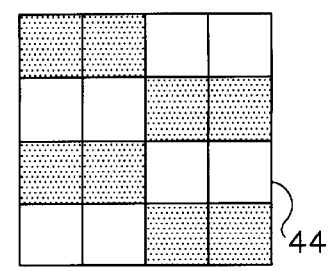

FIGS. 3A, 3B, and 3C show three different 4×4 dot profiles, all having the same number of dots. All 2×2 regions of the dot profile 40 of FIG. 3A have the same number of dots, so its variance is equal to zero (0) (and thus minimal) for this region's size. However, the variance of dot profile 40 for 3×3 regions is not minimal. The dot profile 42 of FIG. 3B shows a pattern in which the 2×2 and 3×3 regions both have minimal variances. Such an image is not unique, as depicted in the dot profile 44 of FIG. 3C, which also has minimal variances for 2×2 and 3×3 regions (albeit the variance is not zero (0) for the 3×3 regions).

Figure 3D:
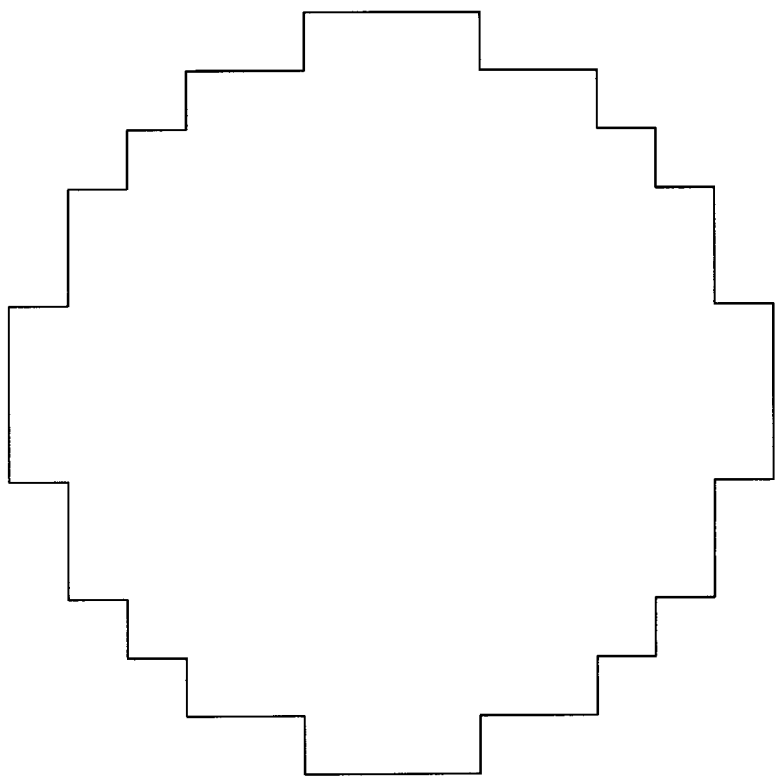
FIG. 3D shows a dot profile of a circular region having a diameter of 13 dots.
Figure 3E:
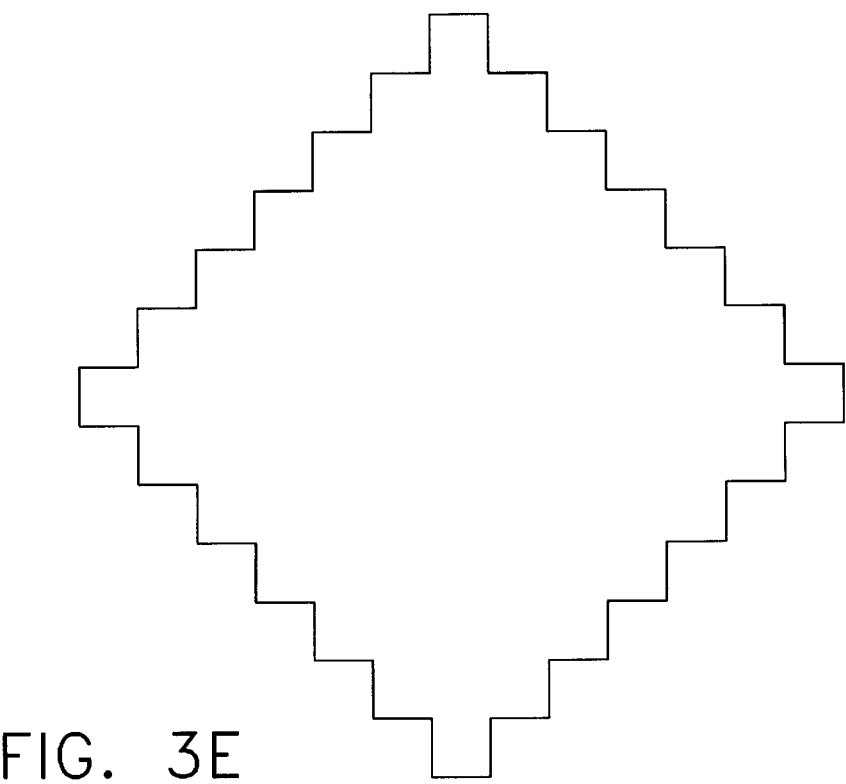
FIG. 3E shows a dot profile of a diamond-shaped region having a diameter of 13 dots.

The shape of the region chosen also has an effect. In FIGS. 3A–3C, the regions were square in shape, however, the regions could instead be circular, as shown in FIG. 3D, or diamond-shaped, as shown in FIG. 3E. Regions having different shapes would yield slightly different results, and in some cases may have advantages.

It is preferred that each new dot profile be created from the previous dot profile. The manner in which the new dot profile will be correlated with the existing one depends upon whether dots will be added or removed. When adding dots, all dots in the existing dot profile will also be present in the new dot profile being created. When removing dots, all empty locations (i.e., locations without a dot) in the existing dot profile will also be present in the new dot profile being created. Given the set of possible choices available within the restrictions of the previous dot profile, the preferred location of the new dots must be determined.

Since it is preferred to eliminate visual patterns that arise from large variations (or a high variance) in the dot density when placing or removing dots, a quantity designated as the "cost function" will be used to determine whether or not an improvement is made when placing or removing a particular dot. The "cost function" is the statistical variance of the above-related density measures, and dots selected such that the cost is minimum provide uniform density without objectionable visual artifacts. In a typical application, a square dot profile may have M×N dimensions of 128×128, thereby providing a total number of dots or pixels of 16,384 (16K). In the instance where the image to be halftoned is a black and white image having gray scale values in the range of 0–255 (i.e., 256 possibilities), then each gray scale level in the dot profile will have 64 dots either more or less than its neighboring gray scale level. For example, at a gray scale of one (1), there would be exactly 64 dots in the entire 16K dot profile.

It is usually advantageous to initially create a dot profile at a mid-level gray scale level (i.e., at a gray level of 127 or 128), rather than to initially create a dot profile for a gray scale of 1 and then increment all the way through to the final gray scale level of 255. Once the initial mid-level dot profile has been created, the next greater dot profile gray scale level would then be created by adding 64 new dots at locations that previously had no dots. By the same token, to create the dot profiles for the lower gray levels, once the initial mid-level dot profile has been created, its next lower gray level would have 64 fewer dots removed from locations that already had dots at the initially-created level. In this manner, the dot profiles for all of the gray levels can be created by merely adding or removing 64 dots at a time to create each new level.

For example, if the next gray level dot profile is to be created by adding dots, consider the effect of adding a single dot. To start with, only a single region size r is considered, and there will be a total number of n=M*N regions of size r. In the typical case, the value of n will be equal to 128 times 128, which is 16,384. There will be this number of regions regardless of the value of r, i.e., if there are regions that are 2×2, there will be 16,384 of them completely covering the total dot profile having dimensions 128×128. If the region size is 3×3, there will still be 16,384 of them. It will be understood that these regions, regardless of their dimension, will overlap one another. Let the variable X[i,j] be the number of dots found in the region centered at position (i,j). This is the density value of the dot profile at location (i,j). Let the variable X'[i,j] be the number of dots found in the region at position (i,j) after the new dot is added.

Using the variables defined in the above paragraph, the change in variance will be equal to Equation 1, as follows:
EQUATION 1:

$$\Delta \text{ Variance} = \frac{1}{n}\sum_{i=1}^{M}\sum_{j=1}^{N}(X'_{i,j})^2 - \left(\frac{1}{n}\sum_{i=1}^{M}\sum_{j=1}^{N}X'_{i,j}\right)^2 - \left[\frac{1}{n}\sum_{i=1}^{M}\sum_{j=1}^{N}X^2_{i,j} - \left(\frac{1}{n}\sum_{i=1}^{M}\sum_{j=1}^{N}X_{i,j}\right)^2\right]$$

Equation 1 has four terms, in which the two left-hand terms are equal to the variance after the new dot has been put in, and the two right-hand terms are equal to the variance before the new dot is put in. The difference between these two quantities, therefore, is equal to the change in variance, which should be minimized to achieve optimal performance in halftoning.

In the analysis presented herein, the variable L[x,y] will refer to the set of all regions that include location (x,y). The value of X[i,j] will be affected by the inclusion of a dot at location (x,y) if and only if region (i,j) is an element of L[x,y]. Thus, X'[i,j]=X[i,j]+1 if location (i,j) is an element of L[x,y] and X'[i,j]=X[i,j] elsewhere:
EQUATION 2:

$$X'_{i,j} = \begin{cases} X_{i,j} + 1 & \text{if } R_{i,j} \in L_{x,y} \\ X_{i,j} & \text{otherwise} \end{cases}$$

In the case of regions having dimensions 3×3 (i.e., r=3), then p=9, so there will be nine such regions in the set L[x,y]. This is demonstrated by an inspection of FIG. 5B, assuming that the new dot is located at the index numeral 13, there will then be nine such 3×3 regions (overlapping one another) within the 5×5 square designated by the index numeral 14 that each contain the dot 13. In this instance, the set L[x,y] would refer to the set of those nine regions that are contained by the box 14.

There will always be p elements in L[x,y], so there will always be p instances in which X[i,j]=X[i,j]+1. Therefore, Equation 1 may be rewritten as shown below:
EQUATION 3:

$$\Delta \text{ Variance} = \frac{1}{n}\sum_{i=1}^{M}\sum_{j=1}^{N}(X'_{i,j})^2 - \left(\frac{1}{n}\left(p + \sum_{i=1}^{M}\sum_{j=1}^{N}X_{i,j}\right)\right)^2 - \left[\frac{1}{n}\sum_{i=1}^{M}\sum_{j=1}^{N}X^2_{i,j} - \left(\frac{1}{n}\sum_{i=1}^{M}\sum_{j=1}^{N}X_{i,j}\right)^2\right]$$

The second and fourth terms no longer depend upon the location of the new dot. Removing them from Equation 3 gives the following equation:
EQUATION 4:

$$\Delta V = \sum_{i=1}^{M}\sum_{j=1}^{N}(X'_{i,j})^2 - \sum_{i=1}^{M}\sum_{j=1}^{N}X^2_{i,j}$$

$$= \begin{cases} \sum_{i=1}^{M}\sum_{j=1}^{N}[(X_{i,j}+1)^2 - X^2_{i,j}] & \text{if } R_{i,j} \in L_{x,y} \\ \sum_{i=1}^{M}\sum_{j=1}^{N}[X^2_{i,j} - X^2_{i,j}] = 0 & \text{otherwise} \end{cases}$$

$$= \begin{cases} \sum_{i=1}^{M}\sum_{j=1}^{N}(2X_{i,j}+1) & \text{if } R_{i,j} \in L_{x,y} \\ 0 & \text{otherwise} \end{cases}$$

After removing the unnecessary constants of Equation 4, the following equations may be obtained:
EQUATION 5:

$$\text{density sum}[i,j] = \sum_{R_{i,j} \in L_{x,y}} X_{i,j}$$

When adding dots (to create the next greater gray scale level), this quantity should be as small as possible. Conversely, when removing dots, the location of regions having the greatest dot density should be chosen.

Noting that the above derivation applies to a single region size, Equation 5 may be further generalized as shown below, where the variable R will represent the number of different region sizes. The "cost" (a measure of the total variance for all regions when considering all region sizes) will be minimized when adding dots, and maximized when removing dots, as follows:

EQUATION 6:

$$\text{cost}[i, j] = \sum \text{density sum}[i, j],$$

The overall cost function in this analysis is defined as a function of the individual costs. In the above analysis, an equally weighted sum of the individual costs was used, however, this cost function could be chosen to customize the behavior of the method of the present invention across the range of individual region sizes. Therefore, the cost function is represented by the following Equation 7:

EQUATION 7:

$$\text{cost}[i,j] = f (\text{density sum}[i,j]_1, \ldots, \text{density sum}[i,j]_R)$$

This cost function, as noted above, could merely be a sum of the individual costs, or could be a weighted summation, as given in the following example:

EQUATION 8:

$$\text{cost}[i, j] = \sum_{r=1}^{R} \text{density sum}[i, j]_r * \text{weight}_r$$

Figures 4A, 4B:
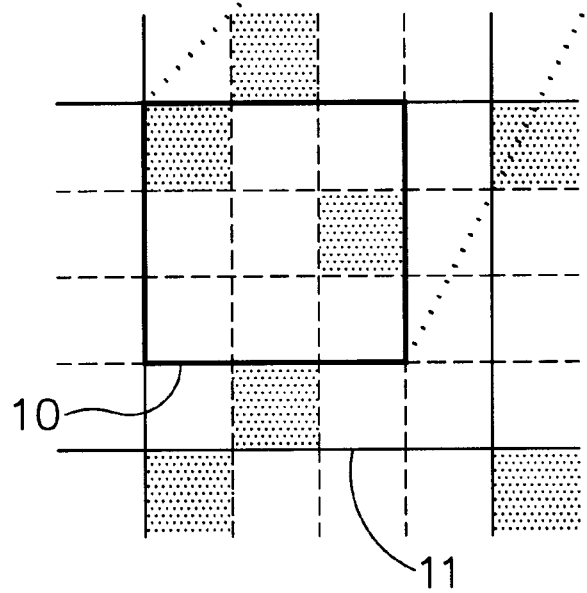
FIG. 4A shows a density array for 3×3 regions.
FIG. 4B shows a tiled dot profile showing the 3×3 region used as the center of the example density array of FIG. 4A.

In order to evaluate the cost function, the number of dots in every affected region of each region size must be known. There will be M*N distinct regions (e.g., 128*128) for each region size. The number of dots in each individual region may be stored in an M×N array, which is referred to as a "density array." Considering only a single region size of 3×3, FIG. 4A shows the correspondence between a single element 8 of such an array 9, and the 3×3 region 10 of a dot profile 11 on FIG. 4B. FIG. 5B shows a tiled dot profile 12 containing a single dot 13. The extent of all 3×3 regions affected by this single dot 13 is a square designated by the index numeral 14. FIG. 5A shows a tiled density array 16, and the regions 14 of FIG. 5B correspond to the 9 elements depicted by the index numeral 15 shown in the tiled density array 16. The number and position of regions that will be affected by a particular dot location is determined by the size and shape of the region.

Figures 5C, 5D, 6B, 6C:
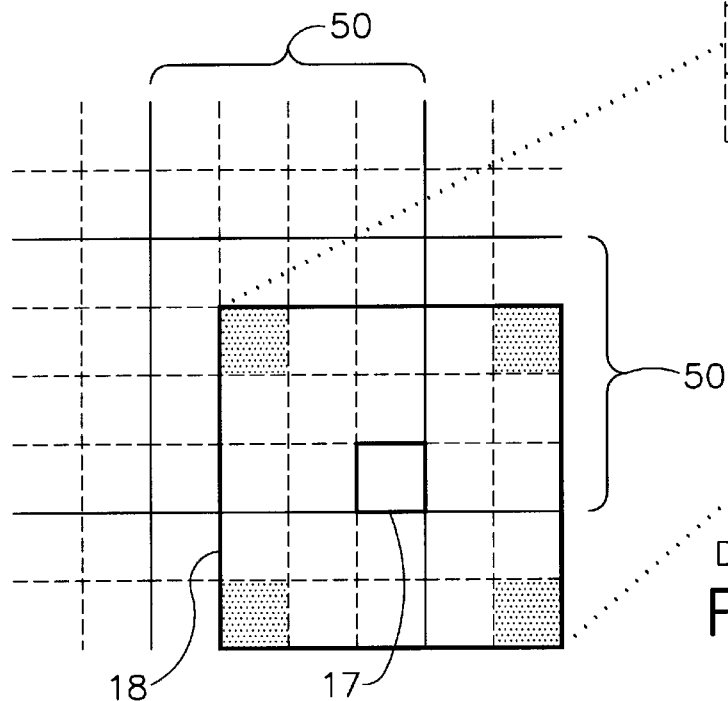
FIG. 5C shows a density array highlighting a different location where a dot may be added.
FIG. 5D shows a tiled dot profile centered on the location where a dot may prospectively be added as shown in FIG. 5C.
FIG. 6B shows a density array based upon 3×3 square regions.
FIG. 6C shows a 4×4 density sum array based on 3×3 square regions.

FIG. 5D shows the same tiled dot profile as in FIG. 5B. However, a different location 17 is marked in the dot profile. If a dot were added to location 17, then the set of 3×3 regions within the square designated by the index numeral 18 would be affected. These affected 3×3 regions correspond to the set of elements 19 in the tiled density array of FIG. 5C. If a dot were added to location 17, these 9 elements 19 would each be incremented by 1. Equation 5 indicates that dots should be chosen for inclusion in the dot profile such that the sum of the density values incremented will be minimal.

FIG. 6C depicts a density sum array designated by the index numeral 20. Each element of density sum array 20 stores the sum of the density values that would be modified by the inclusion of a dot at the corresponding location of the dot profile. For example, dot element 21 is the sum of the values in the set of density array elements 15 (see FIG. 5A), which corresponds to the inclusion of dot 13 in dot profile 12 (see FIG. 5B). Selection of empty location 17 (see FIG. 5D) for inclusion of another dot is justified by the fact that the value of its corresponding location 22 (see FIG. 6C) in the density sum array 20 is a minimum. In this case, the minimum value in the density sum array is equal to four (4), and the fact that several locations are minimal indicates the need for using additional region sizes.

Once a dot is selected for inclusion, the dot profile, affected densities, and density sums must be updated. For the density data, an array of size M×N×R (where R is the number of region sizes) can completely represent all necessary data. Once a location has been chosen for adding or removing a dot, the statistics in the three-dimensional array M×N×R need to be updated. This requires M*N*P increment operations, where P is expressed below in Equation 9:

EQUATION 9:

$$P = \sum_{r=1}^{R} P_r$$

The variable $p_r$ is the number of pixels in a region of size r. The cost function may be re-evaluated using Equation 7, requiring on the order of M*N*P operations. If the cost function is re-evaluated in this manner, a maximum amount of work will be required. However, the storage space and computation time may both be reduced substantially by evaluating the incremental change of the weighting function of Equation 8 for adding or removing a single dot. This procedure reduces the storage requirements to a single M×N array, for storing the cumulative results of Equation 8 for the entire image.

Figure 7:
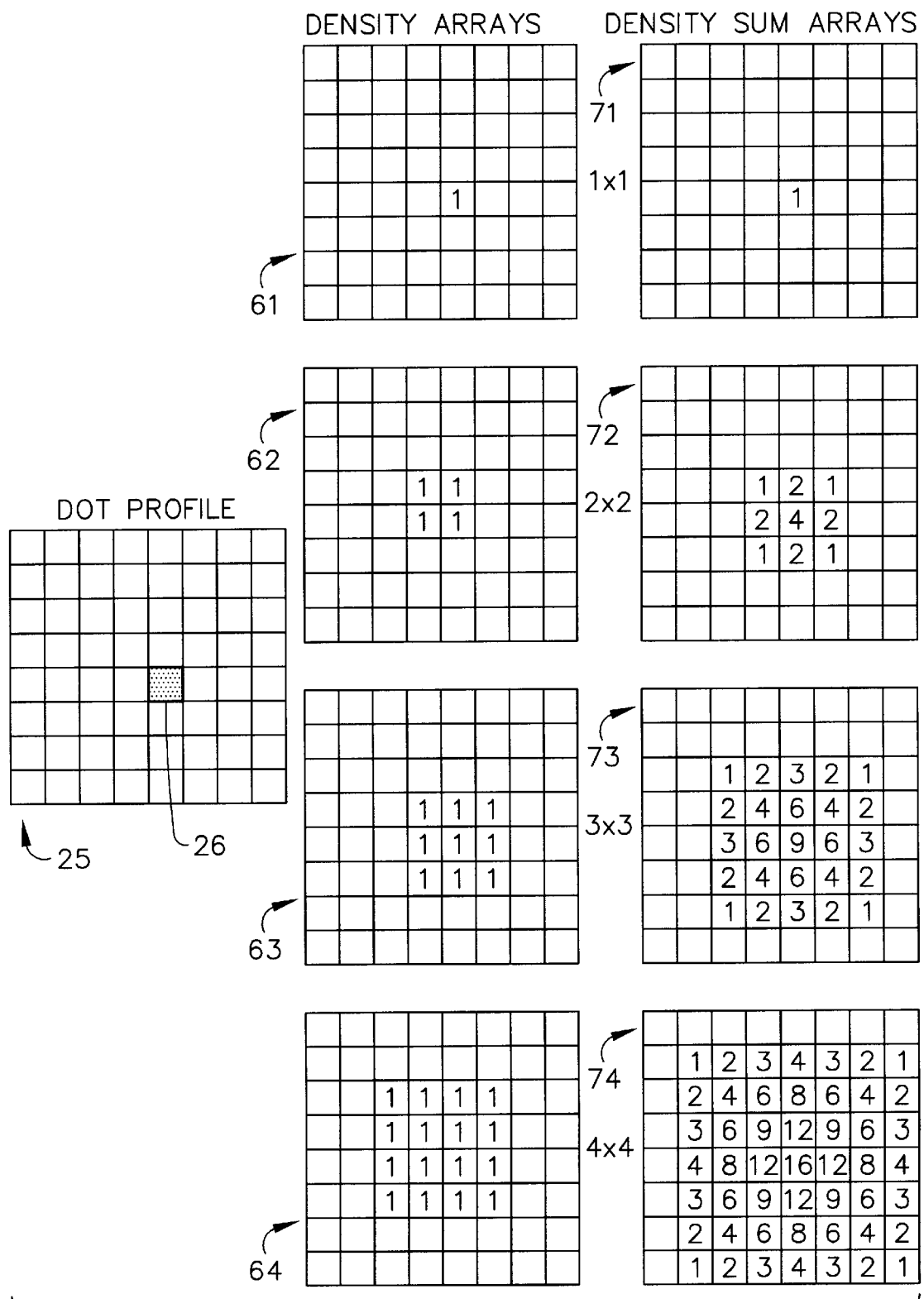
FIG. 7 shows the effect of single dot in a dot profile on density arrays and density sum arrays for different sample sizes.

FIG. 7 depicts a dot profile designated by the index numeral 25 which contains a single dot 26. A series of four different density arrays 61–64 and four different density sum arrays 71–74 are also shown on FIG. 7, which correspond to different region involving sizes for dot profile 25. The values in these arrays indicate the effect of adding a single dot to position 26 of a dot profile, for region sizes 1×1 through 4×4. In FIG. 7, an empty location indicates a value of zero. If the position of the dot were to be shifted, the values in the density sum arrays would undergo a corresponding positional offset modulo the array size.

FIG. 8 shows a "delta density sum" array depicted by the index numeral 27, which is the matrix sum of the density sum arrays each multiplied by a weighting factor. (In FIG. 8, the weighting factor is 0.25 for each of the four density sum arrays.) In FIG. 8, an empty location indicates a value of zero. The result is a weighted average across all region sizes affected by the adding of a single dot to a specific position of the dot profile. The density sum array can be updated by a single matrix addition of the delta density sum array. The offset between the position of the dot being added and position 26 (see FIG. 7) determines a corresponding positional offset to the delta density sum array values. The density sum arrays 81–84 on FIG. 8 correspond to the density sum arrays 71–74 on FIG. 7.

Although the above example uses square region shapes, other shapes and sizes are easily accommodated within the principles of the present invention. Circular region shapes (see FIG. 3D) would give an isotropic increment function. Diamond region shapes (see FIG. 3E) would be a good choice because of the sensitivity of the human visual system to horizontal and vertical linear features, and diamond-shaped regions would tend to decrease the likelihood of selecting locations which would form linear features in the horizontal and vertical directions. Furthermore, the various sizes of regions do not need to all be the same shape, and an arbitrary collection of region shapes and sizes may be handled efficiently according to the principles of the present invention.

Using the above-related optimization criterion, dots may be added to or removed from a particular dot profile to obtain darker or lighter dot profiles. To create a dither array, the corresponding location within the dither array will be labeled with an appropriate threshold value (i.e., gray level). Corresponding to the above-related explanation of a dither array, the threshold value may be determined by an Equation 10, below. In Equation 10, the numerator is the total number of dots in the image, whose dimensions are M×N. The number of gray levels typically is equal to 256. Another more general approach could be to select the threshold value based upon the perceived tone of the actual rendered dot profile, rather than based upon the number of dots.

EQUATION 10:

$$\text{Threshold} = \text{integer}\left(\frac{\text{number of dots} - 1}{M * N} * \text{number of gray levels}\right)$$

When adding or removing a dot, the selection of a single location which produces the minimum variance will give good results. However, such a "greedy" approach is unlikely to give optimal results across the entire range of gray levels. Since the goal is the appearance of a particular gray level, the variance produced by a single dot is not as important as the variance produced by the complete set of dots needed to reach the next gray level. A greedy approach attempts to minimize the variance of the complete dot profile by selecting individual dots whose contribution to the variance is minimal. Such an approach tends not to reach a globally optimal solution, even though the choice of each dot is the best currently available. Since subsequent locations will be constrained by previous selections, selecting the best location for the present dot may lead to worse results in the future selections.

An exhaustive search of all possible dot combinations is prohibitive, but would produce the single best result possible (i.e., the globally optimal solution). The minimization method of steepest decent (the "greedy" approach) may reach a good solution, but not necessarily the best solution since once it has chosen a dot that is not part of the best solution, it will fail to reach the globally optimal dot profile. Better results may be obtained with a method that avoids local minima in its search for a global minimum. "Simulated annealing" is such a method.

Simulated annealing is analogous to a metallurgical process of slowly cooling metal to increase its strength. In simulated annealing, the randomness of a given system is slowly decreased or "cooled," allowing the process to escape local minima and achieve a globally optimal state. This randomness provides a means of accepting a temporary increase in the cost function, which is necessary to escape from a local minimum. As the temperature decreases, so does the probably of accepting a given increase in costs, which assures convergence. Equation 11, below, shows the Boltzmann distribution, which is used to model the randomness, where T is the current temperature and x is the amount by which the cost is increased.

EQUATION 11:

$$f(x) = e^{-x/T}$$

Figure 9:
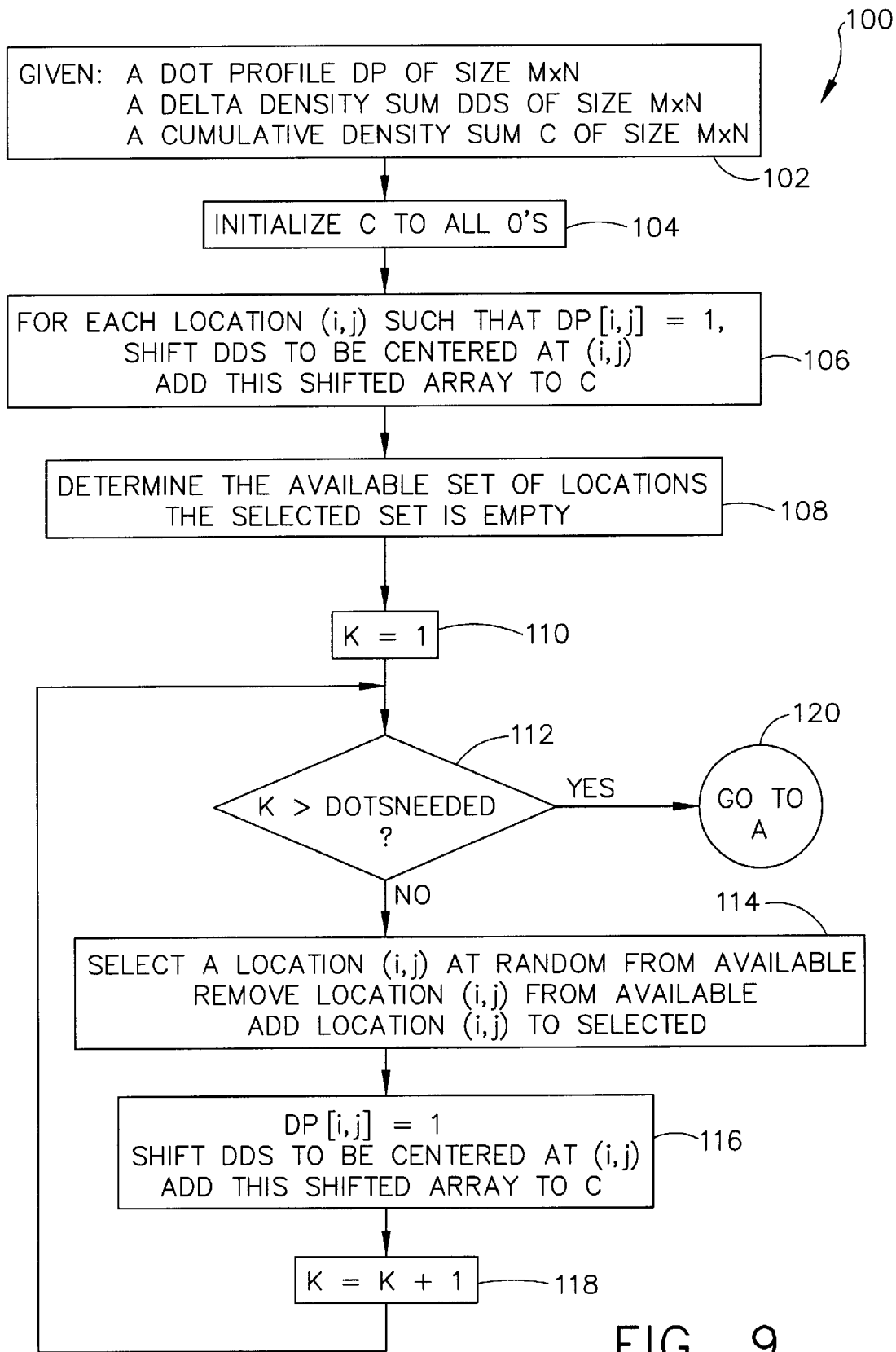
FIG. 9 is a flow chart depicting the initial method steps for determining one gray level according to the principles of the present invention.
Figure 10:
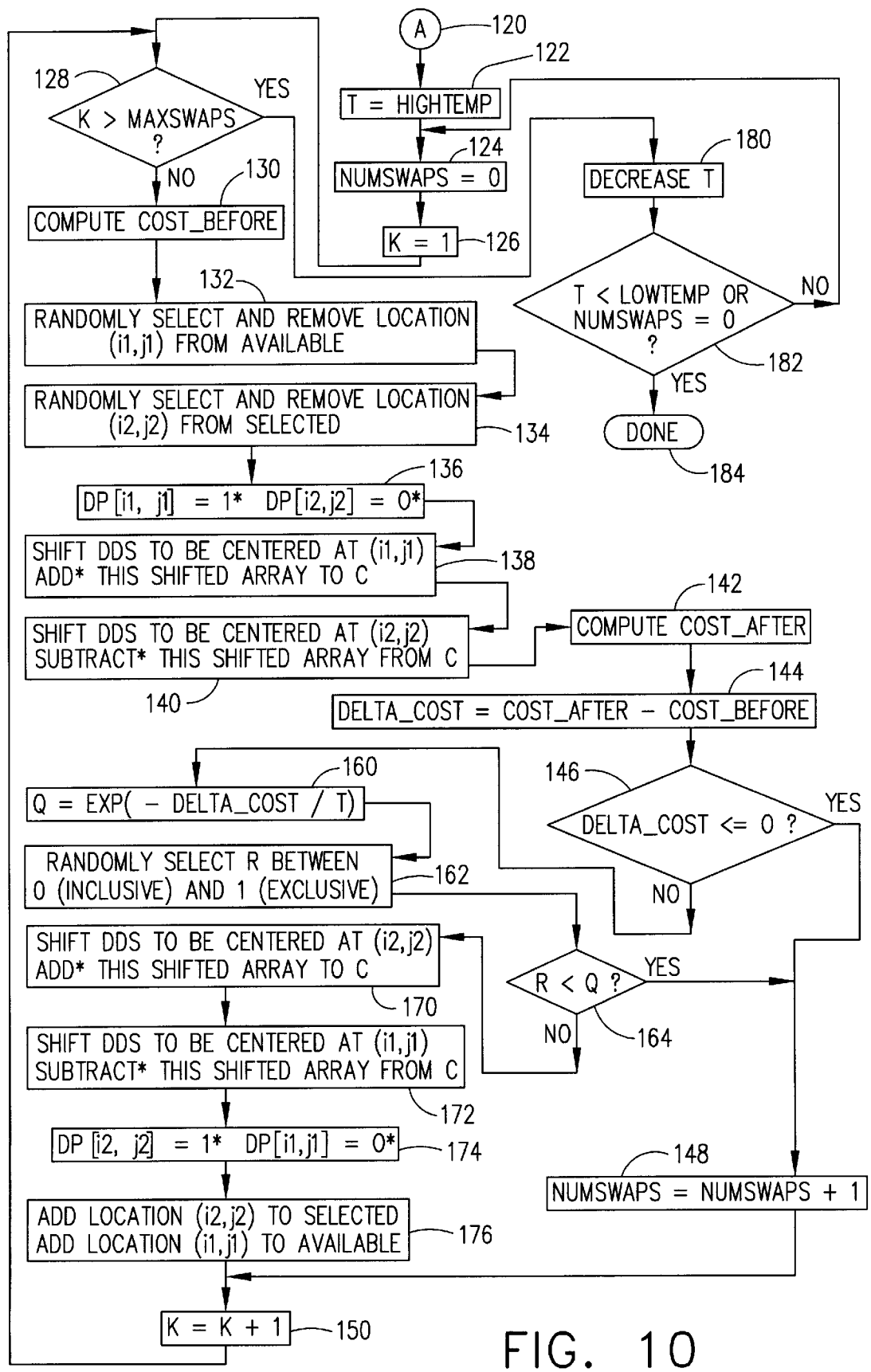
FIG. 10 is a flow chart depicting the remaining method steps for determining one gray level according to the principles of the present invention, including the steps of simulated annealing.

FIG. 9 is a flow chart that illustrates the process of changing the dot profile by one gray level. FIG. 10 shows a flow chart of simulated annealing, which refines the selection of each dot profile.

The process according to the present invention begins with a given dot profile which may be arbitrarily selected. Depending upon whether a darker or lighter dot profile is desired, enough dots are either added or removed to change the gray shade by one level. For a 128×128 dither array representing 256 uniformly spaced gray levels, this requires 64 dots per level. Typically, an initial dot profile would be created, then dots added until the image becomes completely black. Then the initial dot profile would be restored, and dots removed until the image becomes completely white. In the flow chart of FIGS. 10 and 11, it is assumed that dots should be added, however, only minor changes are required to convert certain method steps to remove dots (rather than adding them). These minor changes will be described as needed hereinbelow, and such affected statements are marked with asterisks on FIGS. 9 and 10.

On FIG. 9, the initial portion of the overall flow chart is designated by the index numeral 100, and this includes the portions that are not part of the simulated annealing method steps. At function block 102, a dot profile "DP" of size M×N is created, and the presence of a dot is marked with a one (1), and the absence of a dot is marked with a zero (0). In addition, a delta density sum "DDS" of size M×N is created, and a cumulative density sum C of size M×N is created. At function block 104, the cumulative density sum C is initialized to all zeros.

At function block 106, for each dot location (i,j) in the dot profile DP, the delta density sum DDS function is shifted so that it is centered at (i,j). This shifted array is added to the cumulative density sum array C, so C contains the cumulative sum of the weighting function of Equation 8 evaluated for each dot in the dot profile DP.

The "available" set of locations is determined at function block 108, which stores unique references to those locations within the dot profile DP that are eligible to be changed. If dots are being added, these locations must already be equal to zero (0), but it may be desirable to impose additional restrictions. If dots are being removed, these locations must be set to one (1). The "selected" set is then initialized to null at function block 108.

To obtain the new dot profile, a designated number of dots must be changed. If the gray shade changes uniformly and the next gray level is being produced, then the number of dots needed ("dotsneeded") will be M*N/number of levels, and will be determined by decision block 112. Otherwise, "dotsneeded" may be chosen as a function of the gray shade to be generated. A number of entries equal to "dotsneeded" are selected from the "available" set and moved to the "selected" set, at function block 114. For each of these entries, the delta density function is shifted at function block 116 so that it is centered at the given position, and this shifted array is added to the cumulative density sum array C. If removing dots, the shifted delta density array will instead be subtracted, and the dots at these locations are reversed in the dot profile. The variable K at blocks 110, 112, and 118 is shown on the flow chart 100 as being part of a generic "FOR" loop in computer programming parlance, and a generic computer program for performing the method of the present invention is listed hereinbelow.

The manner in which the "selected" set is determined affects the quality of the resulting dot profile. The selection of these locations is governed by the cost function, which should be minimized for the entire dot profile. Because an exhaustive search is too time consuming, a minimization approach is advised, and preferably, simulated annealing is used. In general, it is preferred that all 64 dots of the next gray shade level be added to the dot profile at locations that are randomly selected from the "available" set (as per function block 114). It is only after all of these 64 dots have been added that the simulated annealing operation is to take place, evaluating the new dot positions of each of the 64 dots, one dot at a time. In general, each new dot is provisionally moved to another "empty" location to see if the overall cost is improved or increased. A certain maximum number of iterations will preferably be selected for determining if any one of the 64 dots should be moved or left in the initially, randomly-selected position.

The details of the simulated annealing method steps are provided in the flow chart of FIG. 10, starting at step 120 and finishing at step 184. The minimum density variance, subject to the weighting function of Equation 8, is evaluated for the dot profile from the cumulative density sum array at function block 130. A pair of locations is chosen at random, one each from the "available" and the "selected" sets. The dots at these two locations are interchanged by function block 132, 134 and 136, and the cumulative density sum array is updated by adding the shifted delta density function where the dot was added and subtracting the shifted delta density function where the dot was removed by function blocks 138 and 140. The cost function is then re-evaluated from the cumulative density sum array C at function block 142. If the cost has been improved, then the swap will be retained at decision block 146. Otherwise, the swap may still be kept if the Boltzmann distribution (Equation 11) is greater than a random value between zero and one, so the swap could be retained even though it actually worsens the cost at function blocks 160 and 162, and decision block 164. If the swap is not retained, then the dot profile and cumulative density sum arrays are restored to their prior contents, as are the "available" and "selected" sets by function blocks 170, 172, 174, and 176. After a fixed number of swaps in which the temperature is decreased, if the temperature has reached a certain minimum or if no locations were swapped, then the procedure terminates at decision block 182.

Trade-offs and experimentation are involved in the selection of parameters for the starting and ending annealing temperatures and the maximum number of swaps, as well as the selection of how to decrease the temperature (e.g., linear versus non-linear cooling). A slower cooling rate takes more time, but increases the optimality of the solution. Likewise, a large number of swaps takes more time, but improves the cost of the solution. In one experiment, an initial temperature was selected to assure that a large majority of swaps would be accepted at first, and the temperature was decreased by 5% on each iteration. In this example, the number of swaps always reached zero before the minimum temperature was reached. Reasonable variations on these parameters would be expected to give comparable results.

The choice of eligible locations in the "available" set optionally may be restricted, using "target" dot profiles which may be used to guide the selection of locations in a particular manner. Only dots which are present in such a target dot profile may be considered for the "available" set, assuming that dots should be added. If removing dots, then the "available" set is restricted such that the locations are vacant in the target dot profile. Because the target dot profiles may possess certain desirable traits, this approach improves the quality of the dither array. It will be understood that the choice of region sizes and shapes, as well as their particular weighting, should be compatible with these desired traits.

The target dot profiles may not be adaptable to the characteristics of a particular display device, typically a printer. In a physical printing system, isolated pixels may be difficult to print at the finest resolution. By providing target dot profiles which minimize isolated pixels, the method of selecting swap locations may be guided similarly. The smallest region size should be adjusted to the desired size of the smallest cluster. The advantage is that the target dot profiles do not need to be constrained as strictly as the dither array.

Another use of target dot profiles is to relieve the requirement that dot profiles be generated in consecutive order. For example, suppose there exists a dot profile for gray level 64. Rather than generating the dot profile for the adjacent level 65 next, a higher level could be generated instead, such as level 128. The dot profile for level 128 could then be used as a target dot profile, for generating dot profiles between levels 65 and 127, inclusive, from the original level 64 dot profile. In this circumstance, the flow chart at function block 108 (see FIG. 9) would be constrained to choose, while determining the "available" set of locations, from those dot locations that exist in the level 128 dot profile.

For consistency with previously assigned threshold values, all white pixels in the dot profile should be present in the target when removing dots, and all black pixels should be present when adding dots. Otherwise, the target dot profiles are unrestricted. As the gray level of the dither array approaches that of the target dot profile, another target dot profile with a different gray level may be provided in order to prevent the dither array from mimicking the former target dot profile too closely.

Figure 11:
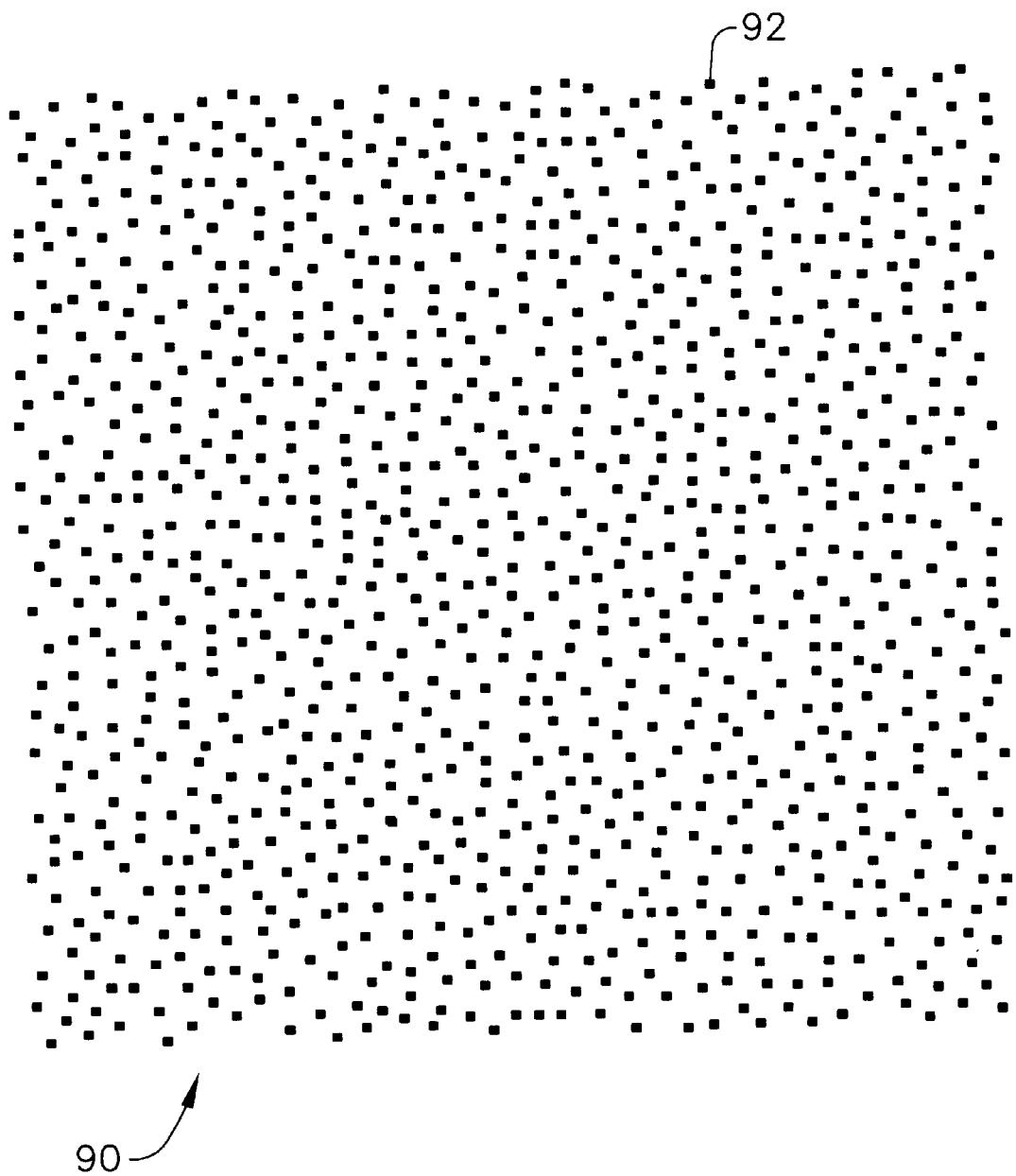
FIG. 11 shows an example of a resulting dot profile for one gray level.

FIG. 11 shows an example of a 128×128 dot profile generated by the minimum density variance method, printed at a resolution of approximately 25 dots per inch. In this example, circular regions were used with a maximum radius of 5 pixels. The density functions were combined with equal weighting. As indicated by this illustration, the dots are dispersed uniformly without the presence of objectionable visual artifacts.

A generic computer program follows below, showing the major commands for implementing the method of the present invention. One of ordinary skill will be able to easily correlate this computer program with the flow charts on FIGS. 9 and 10, and the "line numbers" to the left of the computer program listing correspond to the index numerals on FIGS. 9 and 10. The asterisks designate locations where opposite logic is to be used when removing dots (to create a lower gray level). For example, at line 136, the result would be changed from 1 to 0; and on line 138, a subtraction would occur instead of an addition.

```
(102)   given an MxN dot profile DP
        given an MxN delta density sum function DDS
        given an MxN cumulative density sum array C
(104)   initialize C to all 0's
(106)   for all i
            for all j
                if DP [i,j] = 1 then
                    shift DDS array so that it is centered at (i,j)
                    add this shifted array to C
```

-continued

```
                    endif
                endfor
            endfor
(108)   determine the set of available locations such that
            DP [i,j] = 0 and DP [i,j] may be changed to 1 (if adding dots), or
            DP [i,j] = 1 and DP [i,j] may be changed to 0 (if removing dots)
        initialize the selected set to null
(110, 112, 118)
        for k = 1 to dotsneeded
(114)       select a location (i,j) at random from the available set
            remove location (i,j) from the available set
            add location (i,j) to the selected set
(116)           DP [i,j] = 1
                shift DDS array so that it is centered at (i,j)
                add this shifted array to C
            end for
(122)       T = hightemp
            repeat
(124)           numswaps = 0
(126, 128, 150)
                for k = 1 to maxswaps
(130)               compute cost_before
(132)               randomly select and remove (i1, j1) from the available set
(134)               randomly select and remove (i2, j2) from the selected set
(136)               DP [i1, j1] = 1*
                    DP [i2, j2] = 0*
(138)               shift DDS array so that it is centered at (i1, j1)
                    add* this shifted array to C
(140)               shift DDS array so that it is centered at (i2, j2)
                    subtract* this shifted array from C
(142)               compute cost_after
(144)               delta_cost = cost_after – cost_before
(146, 148)          if (delta_cost <= 0) then     # keep the improvement
                        numswaps = numswaps + 1
                    else
(160)                   q = exp (–delta_cost/T)
(162)                   r = a random number between 0 and 1
(164, 168)              if (r < q) then             # keep anyway, even though it's worse
                            numswaps = numswaps + 1
                        else                        # don't keep—undo the swap
(170)                       shift DDS array so that it is centered at (i2, j2)
                            add* this shifted array to C
(172)                       shift DDS array so that it is centered at (i1, j1)
                            subtract* this shifted array from C
(174)                       DP [i2, j2] = 1*
                            DP [i1, j1] = 0*
(176)                       add (i2, j2) to selected set
                            add (i1, j1) to available set
                        endif
                    endif
                endfor
(180)           decrease T
(182)   until (T < lowtemp or numswaps = 0)
```

Figure 12:
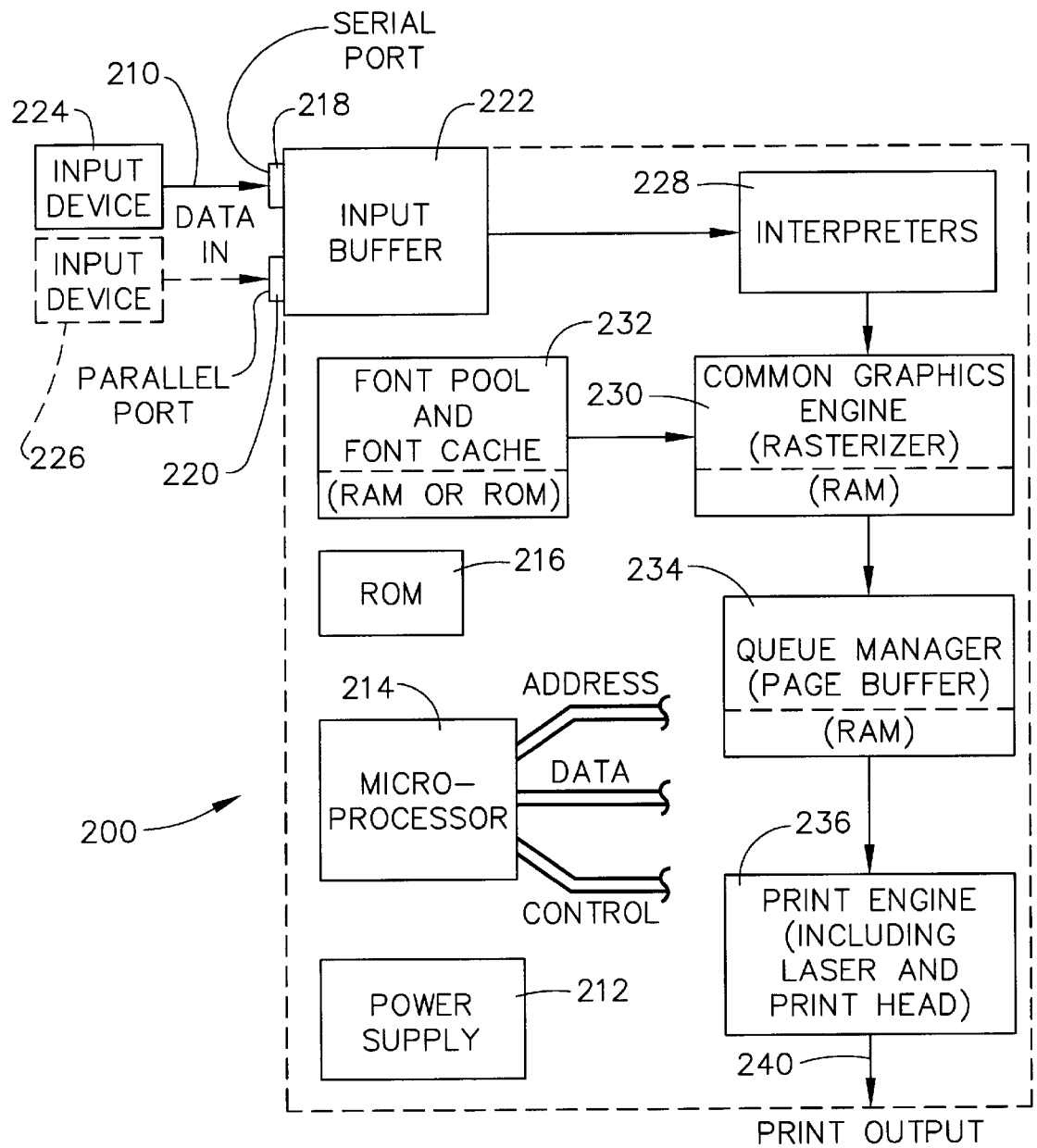
FIG. 12 is a hardware block diagram of the major components used in a laser printer that uses a halftoning dither array designed according to the principles of the present invention.

FIG. 12 shows a hardware block diagram of a laser printer generally designated by the index numeral 200. Laser printer 200 will preferably contain certain relatively standard components, such as a DC power supply 212 which may have multiple outputs of different voltage levels, a microprocessor 214 having address lines, data lines, and control and/or interrupt lines, Read Only Memory (ROM) 216, and Random Access Memory (RAM), which is divided into several portions for performing several different functions.

Laser printer 200 will also contain at least one serial input or parallel input port, or in many cases both types of input ports, as designated by the index numeral 218 for the serial port and the index numeral 220 for the parallel port. Each of these ports 218 and 220 would be connected to a corresponding input buffer, generally designated by the index numeral 222 on FIG. 12. Serial port 218 would typically be connected to a serial output port of a personal computer or a workstation that would contain a software program such as a word processor or a graphics package or computer aided drawing package. Similarly, parallel port 220 could also be connected to a parallel output port of the same type of personal computer or workstation containing the same type of programs, only the data cable would have several parallel lines, instead of only a pair of wires that makes up many serial cables. Such input devices are designated, respectively, by the index numerals 224 and 226 on FIG. 12.

Once the text or graphical data has been received by input buffer 222, it is commonly communicated to one or more interpreters designated by the index numeral 228. A common interpreter is PostScript, which is an industry standard used by most laser printers. After being interpreted, the input data is typically sent to a common graphics engine to be rasterized, which typically occurs in a portion of RAM designated by the index numeral 230 on FIG. 12. To speed up the process of rasterization, a font pool and possibly also a font cache is stored, respectively, in ROM or RAM within most laser printers, and these font memories are designated by the index numeral 232 on FIG. 12. Such font pools and caches supply bitmap patterns for common alphanumeric characters so that the common graphics engine 230 can easily translate each such character into a bitmap using a minimal elapsed time.

Once the data has been rasterized, it is directed into a queue manager or page buffer, which is a portion of RAM designated by the index numeral 234. In a typical laser printer, an entire page of rasterized data is stored in the queue manager during the time interval that it takes to physically print the hard copy for that page. The data within the queue manager 234 is communicated in real time to a print engine designated by the index numeral 236. Print engine 236 includes the laser and the print head, and its output is the physical inking onto a piece of paper, which is the final print output from laser printer 200. It will be understood that the address, data, and control lines are typically grouped in buses, and which are physically communicated in parallel (sometimes also multiplexed) electrically conductive pathways around the various electronic components within laser printer 200. For example, the address and data buses are typically sent to all ROM and RAM integrated circuits, and the control lines or interrupt lines are typically directed to all input or output integrated circuits that act as buffers.

When a digital image is received (via input buffer 222) that requires halftoning so as to be printed by laser printer 200, the dither array created by the above-related process is used repeatedly over the entire incoming image to create a halftoned result. This process occurs in the common graphics engine 230, as part of the rasterization procedure to create the bitmapped image (now halftoned) that will be passed to the queue manager 234 to ultimately be printed by print engine 236 as printed output, at index numeral 240. It will be understood that the dither array residing within laser printer 200 has already been created, and exists within the ROM 216 or common graphics engine 230. It typically would not be efficient for the laser printer itself to create the dither array.

The same hardware as depicted in FIG. 12 can also be used in a color printer that uses digital halftoning with multiple threshold arrays. In conventional color printers, each color plane requires a threshold array for each color that is to be printed. On four-color printers (i.e., "CMYK," or cyan, magenta, yellow, black printers), a separate threshold array is provided for each of the four (4) colors. In three-color printers (i.e., "CMY," or cyan, magenta, yellow printers), there would be three planes, each requiring its own threshold array.

Various methods have been implemented to create threshold arrays used in conventional printers for each of the color planes, such as a "dot-on-dot" method, a "shifting" method, and a "fixed partitioning" method. One aspect of the present invention provides the necessary threshold arrays using stochastic dithering with minimum density variance, as described hereinabove. Another primary aspect of the present invention is to provide "interlocked" stochastic screens, in which each of the individual stochastic screens is designed so that they may fit together to provide a combined pattern of dots which has a visually pleasing "blue noise" distribution, and which will be far superior to the combination of color planes that are possible using conventional independent threshold arrays for each color plane.

Some simple examples are provided in relation to FIGS. 13–25, and are intended to illustrate the method of the present invention of generating a set of interlocked stochastic threshold arrays. It will be understood that the procedure to generate these threshold arrays would typically be performed on a powerful computer, perhaps even a mainframe. Once the threshold arrays are generated, they are stored in the color printer 200.

Figure 13:
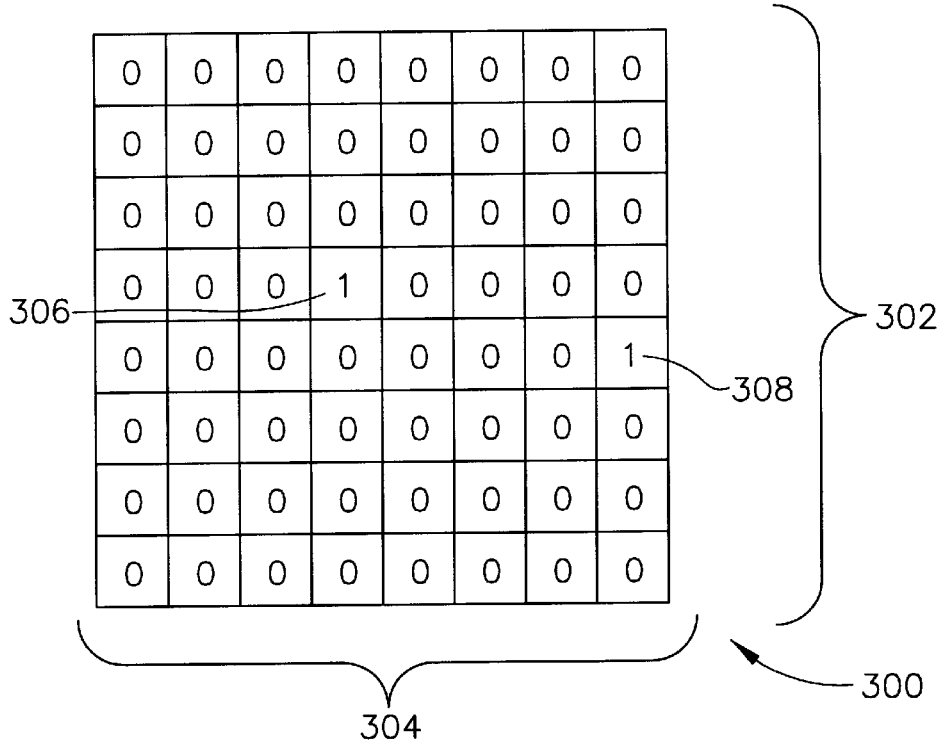
FIG. 13 shows an 8×8 binary bitmap, termed "Bitmap #1."
Figure 14:
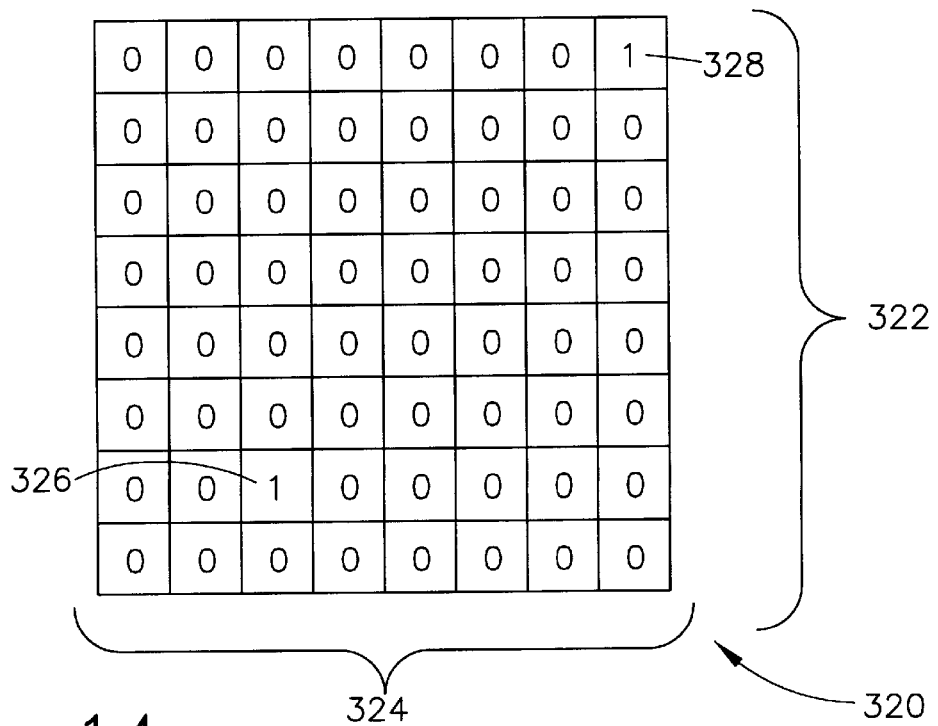
FIG. 14 shows an 8×8 binary bitmap, termed "Bitmap #2."

Starting with two bitmaps as depicted in FIGS. 13 and 14, it will be assumed that there are two (2) color planes in these examples. In FIG. 13, a dot profile is depicted as a bitmap of binary values, in which the numeral "1" represents a dot, and the numeral "0" represents a non-printed area. The bitmap 300 will also be referred to herein as "Bitmap #1," which is an 8×8 array of binary data, having eight (8) rows generally depicted by the reference numeral 302, and eight (8) columns, generally depicted by the reference numeral 304. The only two dots in Bitmap #1 are located at the reference numerals 306 and 308.

A second color plane is depicted as a dot profile on FIG. 14, which also is a bitmap 320. Bitmap 320 will also be referred to herein as "Bitmap #2," which is an 8×8 array of binary data. Bitmap #2 has eight (8) rows at 322 and eight (8) columns at 324. Bitmap #2 also has only two dots, located at the reference numerals 326 and 328.

Figure 15:
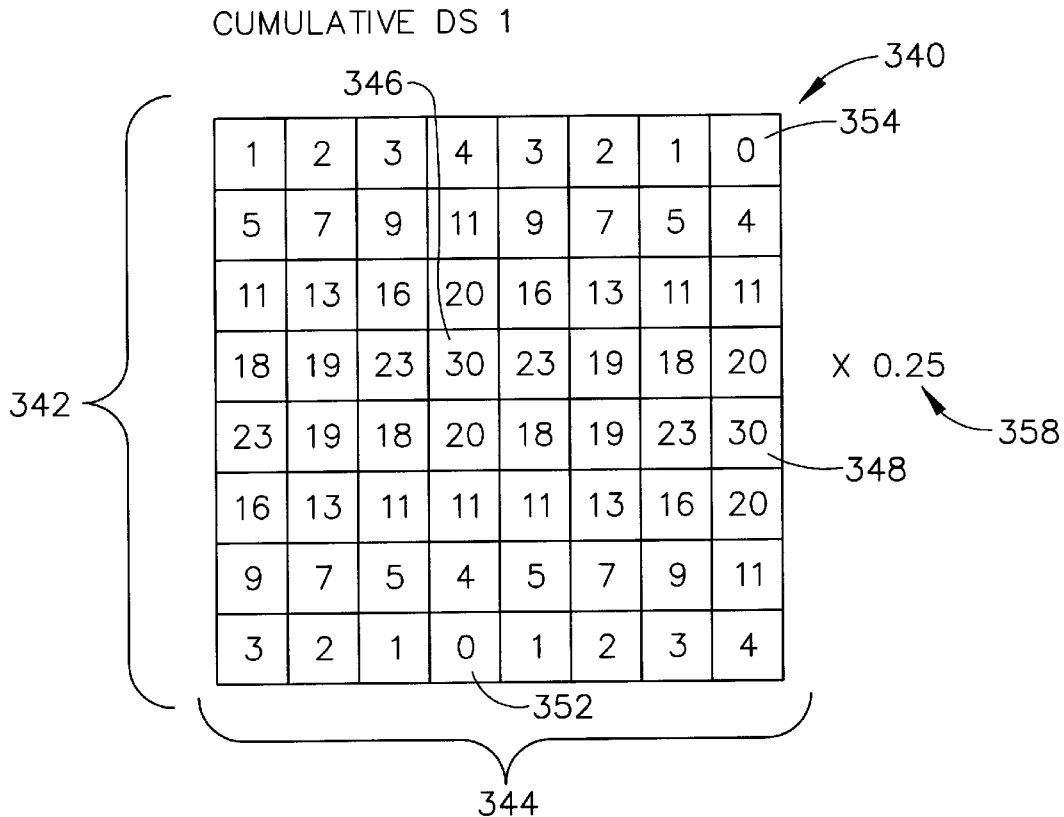
FIG. 15 shows an 8×8 cumulative density sum array based on density sum arrays for different region sizes, using the minimum density variance method, of the Bitmap #1 of FIG. 13.

FIG. 15 is a cumulative density sum array 340, which was generated in the same manner as the examples described hereinabove in FIGS. 7 and 8. Cumulative density sum array 340 has eight (8) rows at 342 and eight (8) columns at 344. In FIG. 15, the statistics were gathered within square regions of sizes 1, 2, 3, and 4 pixels, yielding a density sum array for each of these four (4) region sizes. These four (4) density sum arrays were then averaged together, thereby forming the cumulative density sum array depicted in FIG. 15 by the reference numeral 340, and which will sometimes be referred to hereinbelow as "CDS #1." As will be seen below, CDS #1 acts as an "intermediate" array, leading to further arrays used in the present invention.

Figure 16:
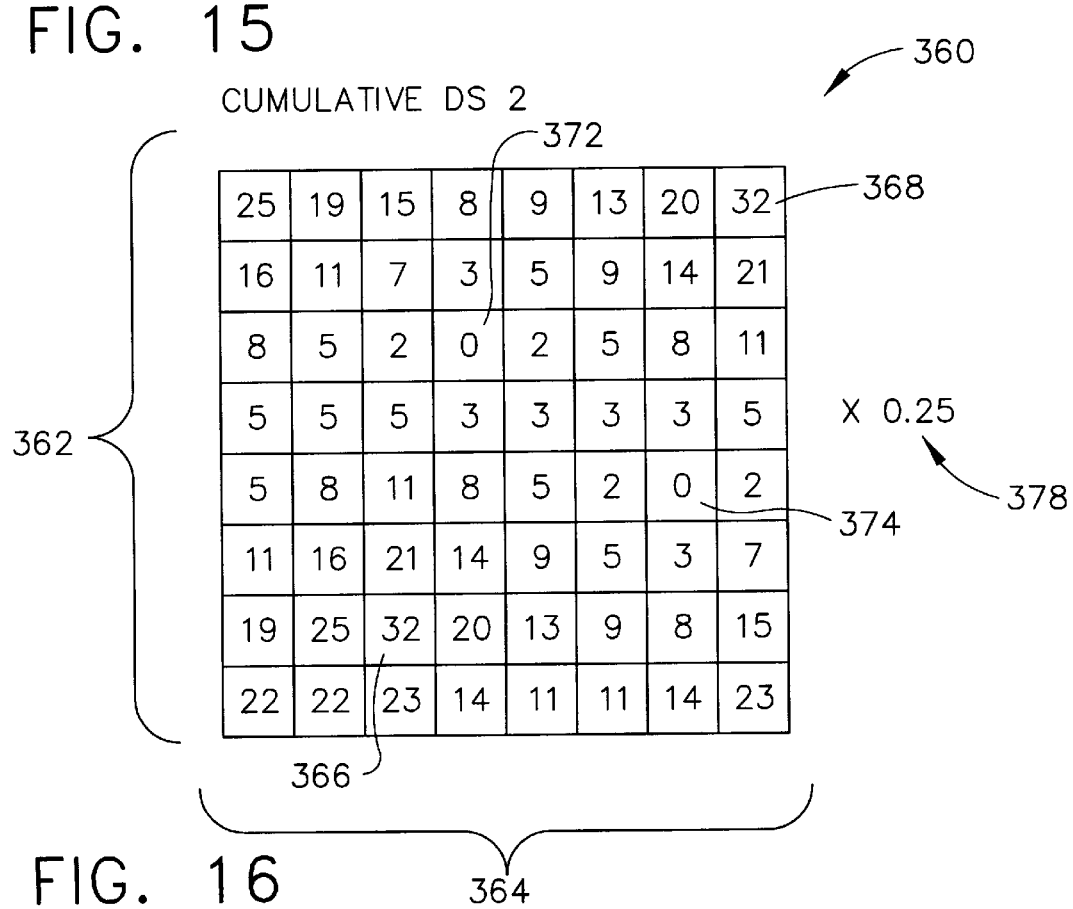
FIG. 16 shows an 8×8 cumulative density sum array based on density sum arrays for different region sizes, using the minimum density variance method, of the Bitmap #2 of FIG. 14.

FIG. 16 is a cumulative density sum array 360 of the Bitmap #2 from FIG. 14, and also was generated in the same manner as the example described hereinabove in FIGS. 7 and 8. Cumulative density sum array 360 has eight (8) rows at 362 and eight (8) columns at 364. As in the case of FIG. 15, the statistics were gathered within square regions of sizes 1–4 pixels, yielding four (4) density sum arrays which were averaged together to form the cumulative density sum array depicted by the reference numeral 360, and which will sometimes be referred to hereinbelow as "CDS #2." As will be seen below, CDS #2 also acts as an "intermediate" array, leading to further arrays used in the present invention.

Suppose that a dot will be added to one of the two bitmaps of FIGS. 13 and 14. Following the method described hereinabove (i.e., using a minimum density variance to create the threshold array), the new dot should be placed at the "minimum" location within its associated cumulative density sum array. For Bitmap #1, there are two (2) of these minima, at the array locations depicted by the reference numerals 352 and 354. There are also two (2) maxima, depicted at the reference numerals 346 and 348, which correspond to the original dot locations 306 and 308. The multiplying factor "0.25" at 358 denotes the fact that the four (4) square regions were added together and then multiplied by this multiplying factor to arrive at the numbers depicted on FIG. 15.

When there is more than one minima, any one may be chosen arbitrarily for the new dot location. Therefore, when treating the first color plane of Bitmap #1 as an independent plane, it will make no difference as to whether the new dot is placed at 352 or 354. Either location will have a pleasing appearance when viewing this color plane alone, although there is no way of knowing how its visual effect will appear when combined with the other color plane.

For Bitmap #2, there are two (2) minima at numerals 372 and 374 on FIG. 16. There are also two (2) maxima at 366 and 368 on FIG. 16, which of course correspond to the original dot locations 326 and 328 on FIG. 14. Again, on FIG. 16 the multiplying factor 378 is provided as "0.25." Since the new dot may be chosen for placement at any of the minima locations when there is more than one such minima, the new dot may be arbitrarily placed at either 372 or 374, and will provide a pleasing visual effect when viewing that color plane alone. As in the case of FIG. 15, it remains to be seen how pleasing the effect will be when these two independently-created color planes are combined. In general, the visual quality will be poor when the two color planes are superimposed together, especially for lighter shades (or intensities).

Each of the cumulative density sum arrays depicted in FIGS. 15 and 16 are equivalent to generating a single-plane stochastic threshold array.

Figure 17:
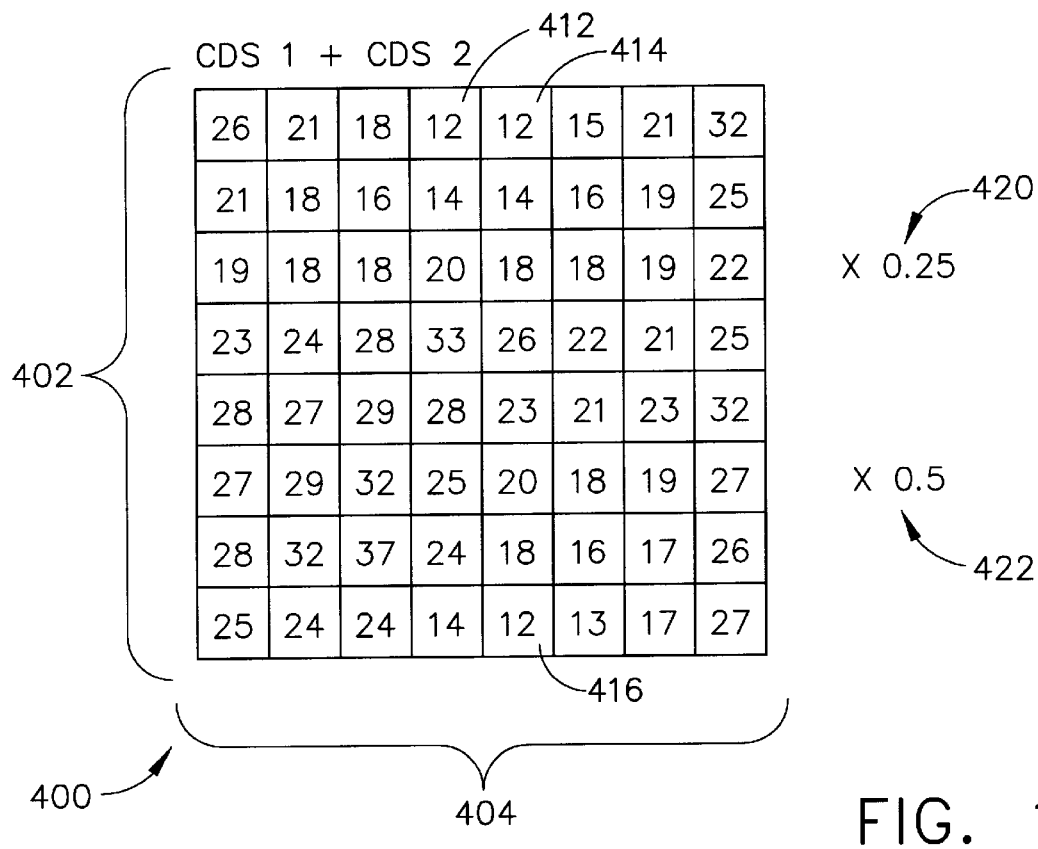
FIG. 17 shows an 8×8 interlocked threshold array which is representative of the average of the cumulative density sum arrays of FIG. 15 and FIG. 16.

In the present invention, the process of generating a set of "interlocked" stochastic threshold arrays considers the bitmaps, and thus the cumulative density sum arrays, for all of the color planes in the system. FIG. 17 is a combined cumulative density sum array 400 in which CDS #1 and CDS #2 are added together as 8×8 arrays, and then averaged using equal weighting. This combined cumulative density sum array 400 has eight (8) rows 402 and eight (8) columns 404, and shows multiplying factors of "0.25" at 420 and "0.5" at 422.

Combined cumulative density sum array 400 exhibits three (3) minima at the reference numerals 412, 414, and 416. If a dot is to be added to Bitmap #1 of FIG. 13, then any one of the three (3) minima are acceptable locations for this added dot.

Suppose that a dot is to be added to Bitmap #1 of FIG. 13. By referring to the combined density sum array 400, any of the same three (3) minima can be chosen for the new dot to be added to Bitmap #1. It should be noted that, if a dot was to be added to Bitmap #2 before another dot is added to Bitmap #1, then the same combined cumulative density sum array 400 would have been produced, and one of the same three (3) locations would be chosen for the new dot for Bitmap #2. It will be understood that when one of the three minima array locations is used to add a dot to one of the two bitmaps, then that particular dot location is now used, and would not be available for placement of adding the next dot for the other color plane.

The non-weighted average used in the approach at the generated bitmap 400 on FIG. 17 gives good visual quality when the two (2) threshold arrays are combined (i.e., superimposed) together, however, the quality somewhat suffers when either of these two (2) threshold arrays are used individually. To improve the quality of the individual use of these threshold arrays, a weighted average is preferred when generating a combined cumulative density sum array. Examples of this type of threshold array are provided immediately following.

Figure 18:
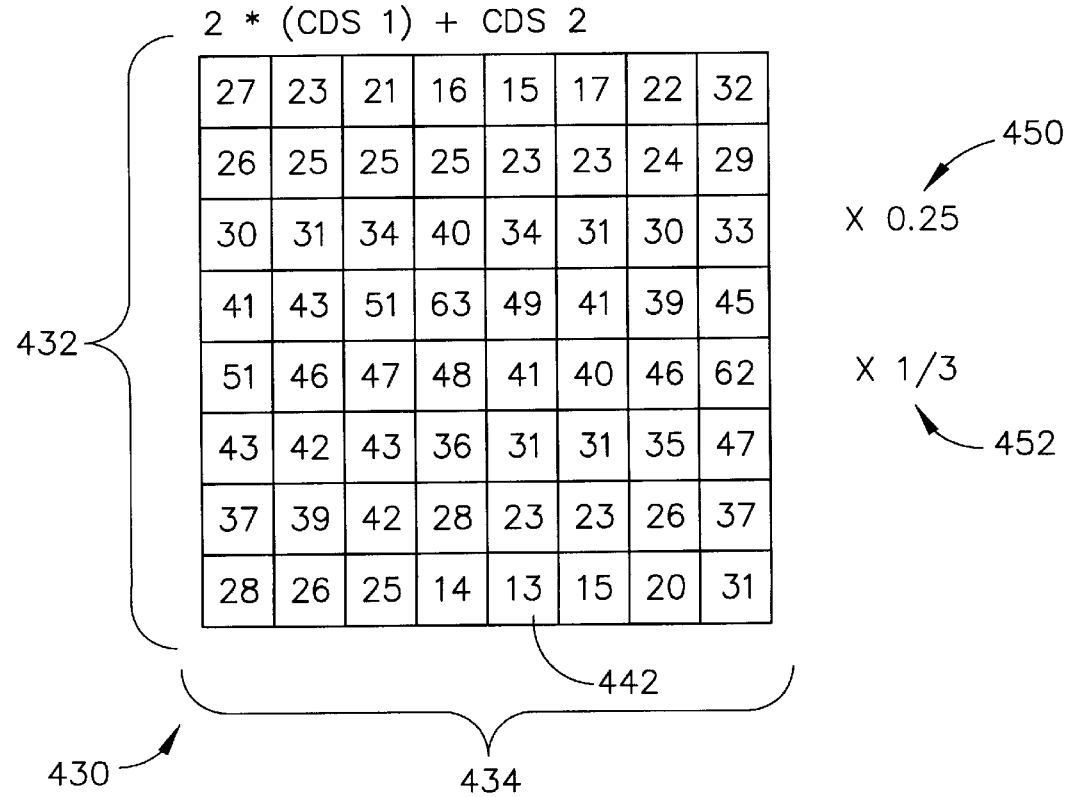
FIG. 18 is an 8×8 interlocked threshold array that is representative of a weighted average of the cumulative density arrays of FIGS. 15 and 16, in which a weighting factor is applied to Cumulative Density Sum Array #1.

FIG. 18 depicts a combined cumulative density sum array 430 which was created by adding CDS #2 (from FIG. 16) to a weighted CDS #1 (from FIG. 15). The weighting factor used to create the combined array 430 was equal to 2.0, and the multiplication factors used were "0.25" at 450 and "⅓" at 452. The overall equation to create combined array 430 is equal to:

$$2*(CDS\#1)+CDS\#2.$$

The combined cumulative density sum array 430 is an 8×8 array of eight (8) rows 432 and eight (8) columns 434. A single minimum is exhibited at the array location [8,5], depicted by the reference numeral 442.

Since a weighting factor has been used to emphasize the first cumulative density sum array (i.e., CDS #1), the com-bined array 430 will be used when adding a dot to Bitmap #1. Since there is a single minimum at 442, the dot should be added to Bitmap #1 at location [8,5].

Figure 19:
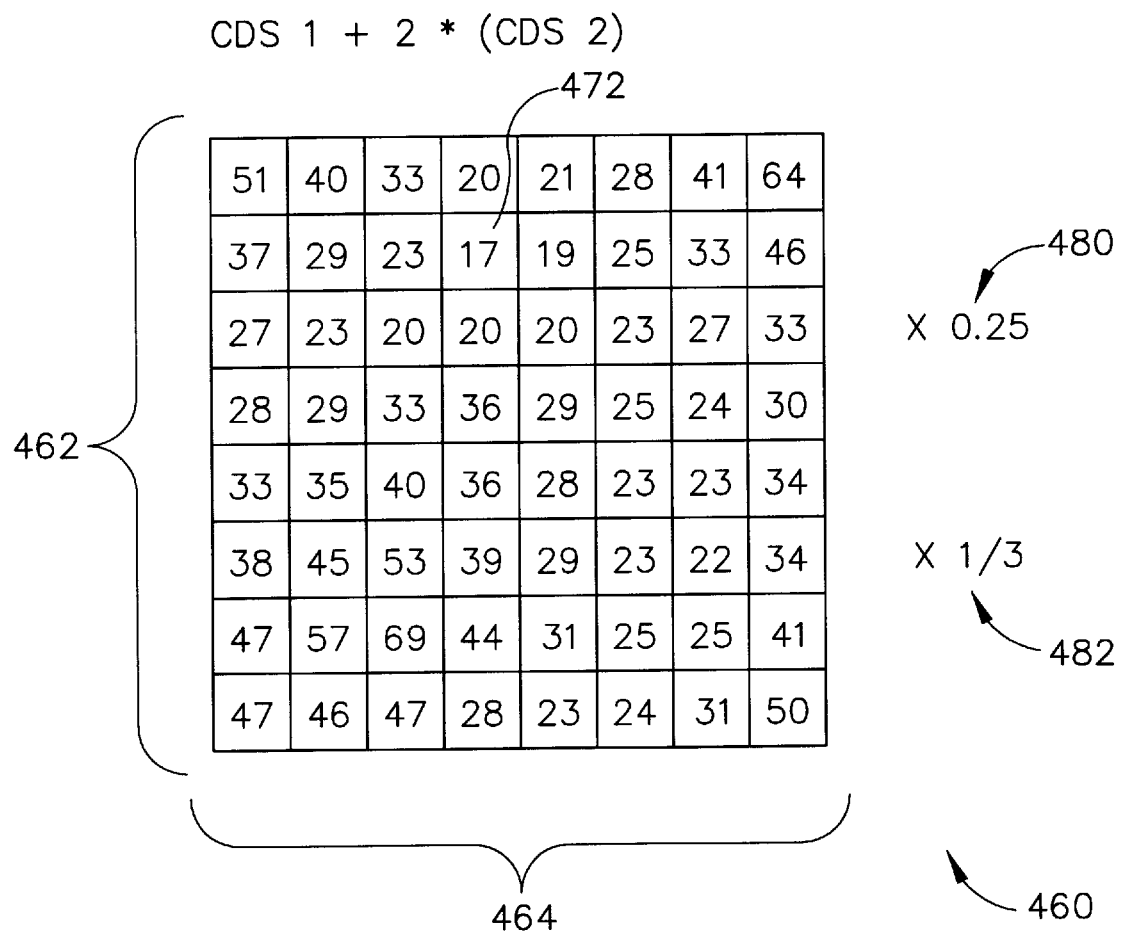
FIG. 19 is an 8×8 interlocked threshold array that is representative of a weighted average of the cumulative density arrays of FIGS. 15 and 16, in which a weighting factor is applied to Cumulative Density Sum Array #2.

Another combined cumulative density sum array generally at reference numeral 460 is depicted in FIG. 19. This combined array is an 8×8 array having eight (8) rows 462 and eight (8) columns 464, and uses multiplying factors of "0.25" at 480 and "⅓" at 482. Cumulative array 460 was generated by weighting the second cumulative density sum array (i.e., CDS #2), by a factor of two (2), and adding the values of this weighted cumulative density sum array to that of CDS #1. Using the multiplying factors at reference numerals 480 and 482, the values arrived at show a single minimum at the array location [2,4], at the reference numeral 472. The equation used in generating combined cumulative density sum array 460 is equal to:

$$CDS\#1+2*(CDS\#2).$$

Since the weighting factor emphasizes Bitmap #2, combined array 460 should be used when adding a new dot to Bitmap #2. Since the minimum is at array location that is where the new dot should be added for Bitmap #2.

It will be understood that, by using appropriate weighting of the cumulative density sum arrays created by the individual bitmaps for each color plane, there will always be a different minimum location or set of minima locations for the threshold arrays being generated for each individual color plane. By weighting a plane's own cumulative density sum array more than the other cumulative density sum arrays of the other color planes, improved visual quality is obtained for individual use of the threshold arrays, and there will only be a slight decrease in visual quality when the individual threshold arrays are combined (superimposed) together to show more than one color at a time.

It will also be understood that both color planes were taken into consideration when generating each of the combined weighted cumulative density sum arrays 430 and 460, depicted in FIGS. 18 and 19. It will be further understood that the same procedure can be utilized with more than two (2) color planes when creating the combined cumulative density sum arrays. When using four-color printing, there could be four color planes, and each of the four bitmaps at a particular "gray level" or intensity will be the starting point to create an individual cumulative density sum array for that particular color plane. According to the principles of the present invention, it is preferred to weight the numeric values in the cumulative density sum array for the same color plane that requires a new dot to be added or subtracted, when it comes time to combine all of the color planes together into a single combined cumulative density sum array. Such combined cumulative density sum arrays are thereby "interlocked" together, by which no new dots will be added to {or removed from} one of the threshold arrays without considering the other color planes at the same time.

In order to show that the principles of the present invention apply to any type of criterion to determine the location of new dots to be added to {or removed from} a color plane, a second example is provided hereinbelow that uses the "void and cluster" algorithm. In this example, the original bitmaps depicted in FIGS. 13 and 14 will again be the starting points. The void and cluster algorithm creates a stochastic threshold array using a spatial domain weighting function or filter. In a technical journal article by Robert Ulichney (Proceedings of the SPIE Volume 1913, pages 332–343, September 1993) titled The Void-and-Cluster Method for Dither Array Generation, a periodic symmetric two-dimensional Gaussian function with a value of 1.5 for the sigma parameter is used for the filter function. This function is convolved with the dot profile for a particular gray level, yielding a filtered array. Voids and clusters are identified from the values in the filtered array.

In the examples below, the same Gaussian function described above will be used as the filter function. Since there are two (2) color planes, depicted by Bitmap #1 and Bitmap #2, the dot profile or bitmap for the first plane will consist of the two (2) dots shown at 306 and 308 on FIG. 13, and the dot profile or bitmap for the second plane will consist of the two (2) dots shown at the numerals 326 and 328 on FIG. 14. A two-dimensional Gaussian filter function is depicted by the array 500 on FIG. 20. This two-dimensional Gaussian filter function has eight (8) rows at reference numeral 502 and eight (8) columns at reference numeral 504.

By convolving Bitmap #1 and Bitmap #2, respectively, with the Gaussian filter function 500 shown in FIG. 20, the results are two (2) filtered arrays 520 and 540 depicted in FIGS. 21 and 22. Each of these filtered arrays 520 and 540 are associated with independently generated stochastic threshold arrays, generated by the void and cluster algorithm. These threshold arrays are single-plane stochastic threshold arrays, and are not interlocked as according to the principles of the present invention.

Suppose that a dot will be added to one of the two bitmaps 300 or 320. Using the void and cluster algorithm, the dot should be placed at the minimum location (i.e., void) within its associated filtered array. When there is more than one minima, any one may be chosen arbitrarily for the new dot location in the array.

In FIG. 21, the filtered array 520 has eight (8) rows at 522 and eight (8) columns at 524. Filtered array 520 exhibits two (2) minima, at array locations [1,8] and [8,4], respectively at the reference numerals 532 and 534. Either one of these locations could be used for adding the new dot.

In FIG. 22, the second filtered array 540 has eight (8) rows at 542 and eight (8) columns at 544. Filtered array 540 also has two (2) minima, at array locations [3,4] and [5,7], respectively indicated at the reference numerals 552 and 554. As in the first filtered array 520, either one of these minima could be chosen for the next location for the new dot to be added to Bitmap #2.

Filtered array 520 and filtered array 540 represent two (2) independent threshold arrays that have been generated. Although each of these threshold arrays will provide good visual quality when used individually, the visual quality will generally be poor when the two color planes are combined (superimposed) together. For that reason, the interlocked threshold arrays of the present invention will provide a substantial improvement, and examples of such interlocked threshold arrays using the void and cluster algorithm are presented immediately below.

Using the same bitmaps 300 and 320 at the starting point, the Gaussian filter function of FIG. 20 is used to create the filtered array 520 and filtered array 540 of FIGS. 21 and 22, respectively. Filtered array 520 will sometimes also be referred to hereinafter as "F1," and filtered array 540 will also be referred to hereinafter as "F2." As in the case with the CDS #1 and CDS #2 arrays 340 and 360, respectively, and described above, filtered arrays F1 and F2 both act as "intermediate" arrays, leading to further arrays used in the present invention.

When generating a set of interlocked stochastic threshold arrays, all of the bitmaps and thus the filtered arrays for all of the color planes will be considered. In FIG. 23, an equally weighted combined filter array 560 is depicted. Combined filtered array 560 has eight (8) rows 562 and eight (8) columns 564. The multiplication factor is indicated as being "0.5" at the reference numeral 580. This indicates that each of the filtered arrays 520 and 540 have been added together and averaged, by multiplying by the indicated factor at 580. The resultant 8×8 array indicates a single minimum at the array location [1,5], as indicated by the reference numeral 572. If a dot is to be added to one of the two bitmaps 300 or 320, following the void and cluster algorithm, the dot should be placed at the single minimum value, having the location as indicated by reference numeral 572, This location should be used regardless as to whether the dot is being added to Bitmap #1 or to Bitmap #2.

Figures 24, 25:
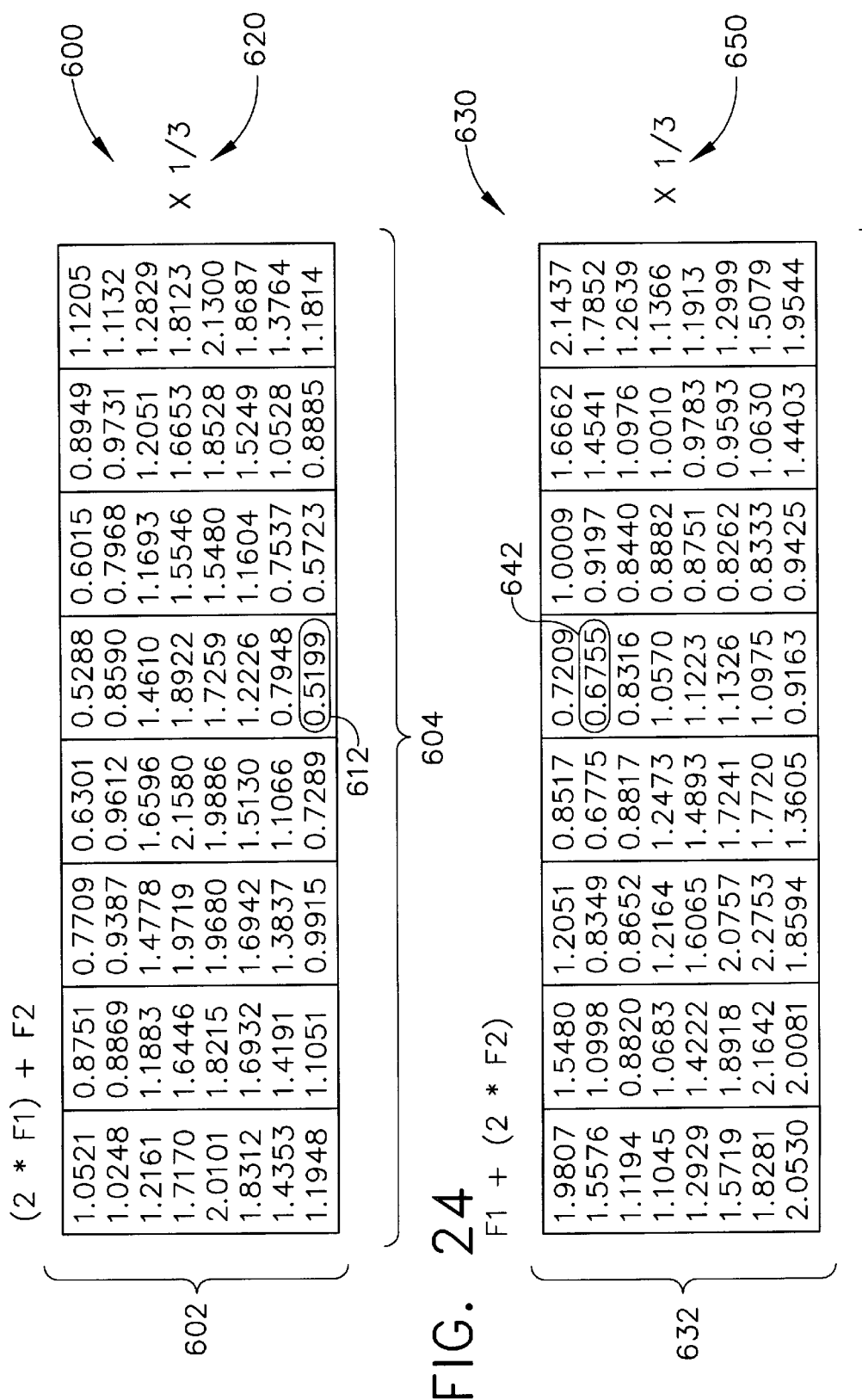
FIG. 24 is an 8×8 interlocked filtered array of unequal weighting of the filtered arrays of FIGS. 21 and 22, in which an increased weighting factor has been applied to Filtered Array #1.
FIG. 25 is an 8×8 interlocked filtered array of unequal weighting of the filtered arrays of FIGS. 21 and 22, in which an increased weighting factor has been applied to Filtered Array #2.

While the combined filtered array 560 will provide good visual quality when the two (2) threshold arrays are combined (superimposed) together, the visual quality will suffer somewhat when either of these threshold arrays are used individually. Therefore, the preferred method of weighting one of the filtered arrays will yield an improved visual quality when using either one of the threshold arrays individually. An example of this procedure is provided in FIGS. 24 and 25, A combined filtered array 600 is depicted in FIG. 24, in which the two (2) filtered arrays 520 and 540 have been combined together. On FIG. 24, filtered array F1 has been weighted by a factor of two (2), and then its result added to the second filtered array F2. The numeric values of the combined filtered array 600 have been multiplied by a factor of "⅓," as indicated at the reference numeral 620. Combined filtered array 600 has eight (8) rows at 602, and eight (8) columns at 604. A single minimum value is located at the array location [8,5], as indicated by the reference numeral 612.

If a dot is to be added to Bitmap #1 (i.e., bitmap 300), the preferred location is at the single minimum array value as indicated by the reference numeral 612. The equation that generated the combined filtered array 600 is as follows:

$$(2*F1)+F2.$$

A second combined filtered array 630 is indicated on FIG. 25 as having eight (8) rows at 632 and eight (8) columns at 634. In array 630, the filtered array 540 (i.e., "F2") has been weighted by a factor of two (2), thus the multiplying factor of "⅓" as indicated at 650. A single minimum is indicated at the array location [2,5], as indicated by the reference numeral 642. The equation used to generate the combined filtered array 630 is as follows:

$$F1+(2*F2).$$

If a dot is to be added to Bitmap #2 (i.e., bitmap 320), the array location 642 of the single minimum is the preferred location where this dot is to be added.

By weighting a plane's own filtered array more than the other filtered arrays, better visual quality is obtained when using the threshold arrays individually. This will be accompanied by only a slight decrease in visual quality when the threshold arrays are combined (superimposed) together. It will be understood that, once the criteria chosen to determine one or more minima or maxima of an array based upon a starting bitmap has been determined, the interlocking concept of the present invention can be used to combine the individual resulting arrays so that the dot patterns of all the color planes are taken into account before adding a single dot to any of the threshold arrays. While it is preferred that the minimum density variance method be used in determining the best locations for individual threshold array additions or removals of dots, it will be further understood that any criterion can be used in combination with the interlocking principles of the present invention to create a set of threshold arrays that can be used in color printing.

As related above, the interlocking method of the present invention can be used in four-color printing, in three-color printing, or for that matter, in a color printing process using any number of color planes. It is preferred that in a color printing process that uses cyan, magenta, and yellow, that the yellow plane be ignored with respect to creating interlocked, as per the principles of the present invention, threshold arrays. Rather, the yellow plane can be generated using some other type of method for independently-generating a threshold array, such as a Bayer matrix or other ordered dot matrix, or an independently generated (i.e., non-interlocked) stochastic threshold array. This will not visibly affect the overall appearance of the combined or individual threshold arrays that are output by the color printer because yellow is virtually undetectable by the human eye when compared to the darker colors of cyan and magenta. This is still true if the four-color process is being used in which the color black is also directly printed.

It will be understood that all of the dark colors to be directly printed will preferably have color planes that are generated using the interlocked method of the present invention. Only very light colors in visual perception, such as yellow, are to be left out of the interlocked threshold arrays, and therefore, generated individually and treated by various methods when creating the various dither levels for the threshold arrays.

Figure 26A:
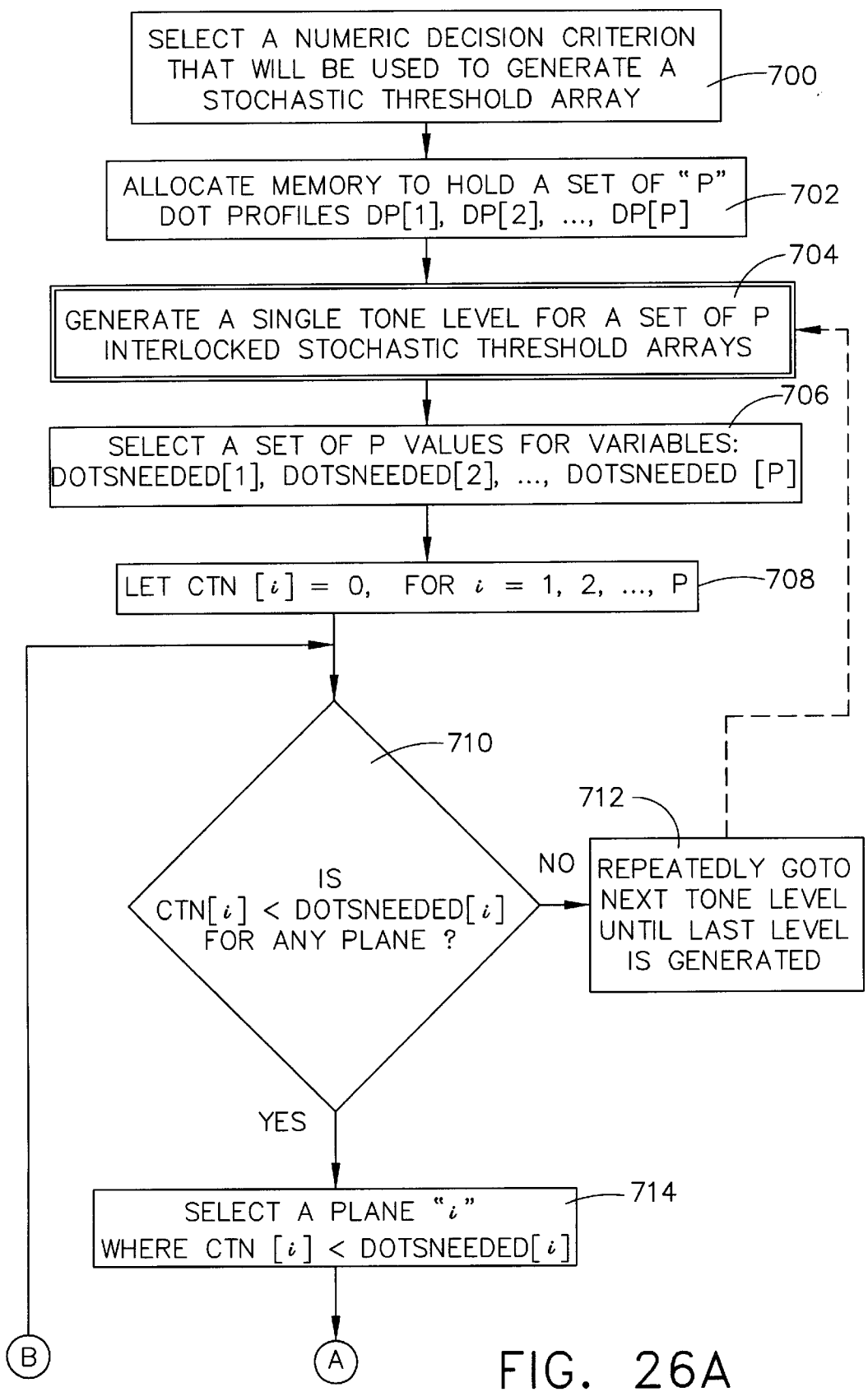
FIGS. 26A and 26B are a flow chart depicting the method steps to generate interlocked stochastic threshold arrays according to the principles of the present invention.
Figure 26B:
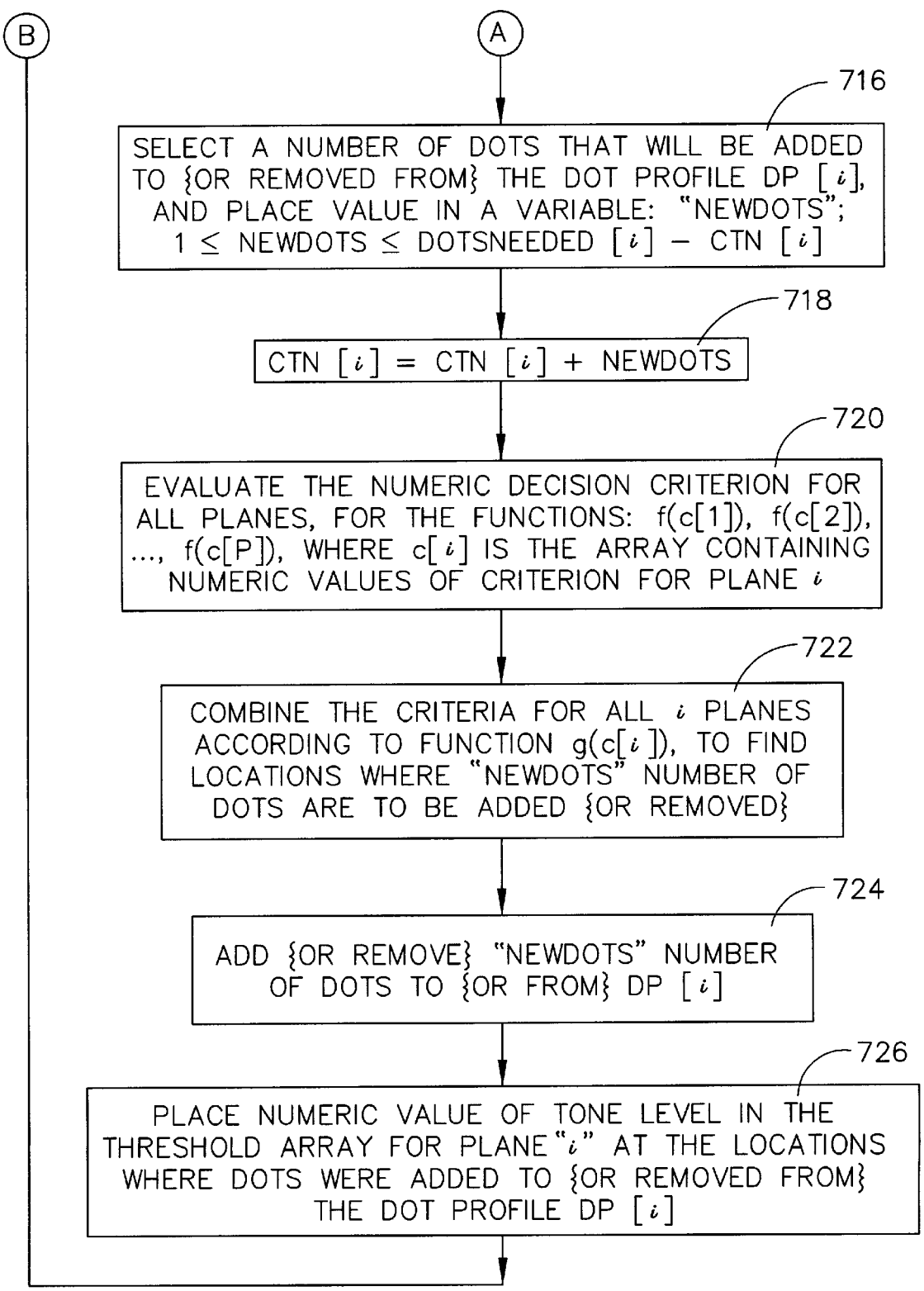

FIGS. 26A and 26B are a flow chart describing the process for generating a single tone level (i.e., color intensity level) for a set of interlocked stochastic threshold arrays. Starting at a function block 700, a specific "numeric decision criterion" is to be selected that will be used to generate a stochastic threshold array. It will be understood that, for the purposes of describing this flow chart, the term "threshold array" is equivalent to the term "dither array." This numeric decision criterion will preferably comprise the minimum density variance method described hereinabove, however, it could be any method that is capable of creating a stochastic threshold array, such as the void and cluster method.

A function block 702 now allocates sufficient memory to hold a set of "P" dot profiles, each having an array size of M×N. The variable "P" refers to the particular color plane that is being operated upon, and there will be as many planes P as there are colors that will be provided with an interlocked stochastic threshold array. As related above, in a CMYK or CMY color printer, the color yellow will not necessarily require an interlocked threshold array, however, it is preferred that all of the other colors that will be printed in such printers have an interlocked threshold array. The dot profiles will be referred to in this flow chart description by the variable names: DP[1], DP[2], and so on up through DP[P].

A function block 704 now begins the process for generating a single tone level (i.e., intensity) for a set of "P" interlocked stochastic threshold arrays. Each of the steps 706–726, with the exception of step 712, fall within the purview of generating this single tone level set of threshold arrays.

A function block 706 selects a set of "P" values for a set of variables called "dotsneeded[1]," "dotsneeded[2]," and so on, through "dotsneeded[P]." This "dotsneeded" variable represents the number of dots that are required to create a single change in tone level or intensity for each of the color planes that are being created by the method of the present invention in this flow chart. For example, it is preferred that the array size for the dot profiles be 128 rows×128 columns, which would be a dot profile having a total of 16,384 pels or dots. If each color can be defined by a binary value between zero (0) and 255, and if the threshold array is to be for a linear intensity scale, then there would need to be sixty-four (64) new dot locations for every step from one tone level to the next tone level. In this situation, the value for the variable "dotsneeded" would be sixty-four (64) for a particular tone level for this color plane.

It will be understood, however, that some of the threshold arrays will not necessarily be linear between tone levels, and furthermore, that each color plane can have a different value of numbers of dots with respect to other color planes for the same tone level. Therefore, the value for the variable "dotsneeded" will not necessarily be the same number for each of the color planes "P," even for the same tone level. That is why the variable values for "dotsneeded" require all of the color planes to have a specific value assigned.

At a function block 708, a counter variable called "CTN[i]" will be initialized to zero (0), for values of i equaling one (1) through "P." This effectively resets the value of the counter variable for all of the color planes at this stage in creating the threshold array for this tone level. This variable CTN[i] represents a counter that keeps track of how many dots have been put down on a particular color plane.

A decision block 710 now determines if the value of CTN[i] is less than the value for "dotsneeded[i]" for any plane at this tone level. If the answer is NO, then the logic flow is directed to a function block 712 and the functions on this flow chart will be repeated for each of the "next" tone levels until all of the tone levels have been generated for this threshold array. If the result is YES at decision block 710, that means at least one of the planes still requires at least one more dot to be added before the operation of creating this tone level has been completed.

A function block 714 now selects a plane "i" in which the value of the count variable CTN[i] is less than the value of "dotsneeded[i]." Keeping in mind that not every color plane has the same number of dots for a given tone level, one of the color planes could be finished at this point, while at least one other color plane may require more dots. At function block 714, one of the planes "i" will be selected where the counter variable CTN[i] is less than the value of "dotsneeded[i]." This will ensure that a color plane has been selected that still needs further dots. The logic flow now passes through the letter "A" while traveling from FIG. 26A to FIG. 26B.

A function block 716 now selects a number of dots that will be added to {or removed from} the dot profile of the present plane, also referred to as "DP[i]." The number of dots that will be added is a numeric value that is placed into a variable called "newdots." There are, however, some limitations on the value that can be placed into the "newdots" variable, because we do not want to add too many dots to this plane. The numeric limitation is such that the value for "newdots" is at least one (1), and the value for "newdots" plus the variable value of CTN[i] does not exceed the present value of the variable "dotsneeded[i]." The correct equation is expressed on the flow chart at function block 716 as:

$$1 \leq \text{newdots} \leq \text{dotsneeded[i]} - \text{CTN[i]}$$

A function block 718 now increases the value of the counter variable CTN[i] by an amount equal to the value of the "newdots" variable.

A function block 720 begins the evaluation process using the numeric decision criterion for all of the planes. This evaluation is equivalent to the functions: f(c[1]), f(c[2]), ..., up through the function f(c[P]). The variable "c[i]" represents the combined array containing numeric values evaluated by the criterion for the plane "i." In the preferred embodiment, function block 720 is equivalent to generating the cumulative density sum arrays 340 and 360, as depicted on FIGS. 15 and 16.

A function block 722 now combines the criteria for all planes "i" according to the function g(c[i]), to find locations where the number of dots that equal the present value for "newdots" are either to be added to {or removed from} the plane. This combination of the criteria can include weighting factors, and should ultimately result in information that will discern one or more minima or maxima of numeric values in the combined array that results. This function block 722 is equivalent to generating the combined cumulative density sum arrays 400, 430, or 460, as depicted in FIGS. 17–19. In the preferred embodiment, multiplication factors were used to create the cumulative density sum arrays, and a weighting factor of two (2) was used for the color plane which required one more or one fewer dot placement. This step 722 is the critical step which interlocks all of the threshold arrays that are being generated according to this flow chart, because it is now determined where the precise array locations are for dots to be added to {or removed from} the current color plane "i" while considering not only the dot profile for this plane "i," but also while considering the dot profiles for all of the other color planes as well.

A function block 724 now adds or removes the appropriate number of dots (which is equivalent to the current value of the variable "newdots") which are being added to {or removed from} the dot profile "DP[i]." After that has occurred, a function block 726 will place the numeric value of the current tone level in the threshold array for the current plane "i" at the precise locations where dots have been added to {or removed from} the dot profile DP[i].

Now that this has been accomplished, the logic flow is directed back to decision block 710 to determine whether or not any more dots are needed for any of the planes at this tone level. After function block 726 has performed its operation, the logic flow travels through the letter "B" on its way back to decision block 710, while traversing from FIG. 26B to FIG. 26A. If the answer is still YES at 710, then the logic flow is directed to function block 714 which will add or remove more dots from the color plane of interest preferably using the numeric decision criterion and the weighted function to find the appropriate array locations where "newdots" are to be added or removed.

It will be understood that the flow chart of FIGS. 26A and 26B represents a general case, and that many of the operations could be modified to perform in a different manner without departing from the principles of the present invention. The combination of all of the criteria for all of the color planes according to a particular finction is the critical step that interlocks the threshold arrays for all of these color planes. While the preferred embodiment weights the criteria by a factor of two (2), for the color plane currently of interest (insofar as either adding or removing a dot at this time), it will be understood that other weighting factor values could certainly be used without departing from the principles of the present invention, or that no weighting factor would necessarily have to be used.

It will be understood that more than one set of interlocked arrays could be stored in a single color printer at the same time. For example, in a CMYK printer there could be #(1) an ordinary, single-plane threshold array, #(2) a set of two interlocked threshold arrays, #(3) a set of three interlocked threshold arrays, and #(4) a set of four interlocked threshold arrays. If a black-only job or area is to be printed, then array #(1) should be selected. If a two-color job or area is to be printed in which one of the two colors is not yellow (an unlikely scenario, but possible), the pair of arrays from #(2) should be selected. In general, the appropriate set of interlocked arrays that should be selected depends upon the actual number of colors that are used at a given time. It will be further understood that a "variable color" print job could, within a single document, use more than one color mode, such as "black-only" mode for one area, a "two-color" mode for the next area, and then even a "three-color" mode for a further area to be printed.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. In a computer system having a processing circuit that operates on data and a memory circuit that stores data, a method for creating a plurality of interlocked threshold arrays for halftoning color images, said method comprising the steps of generating a plurality of single tone levels for a plurality of threshold arrays of color planes by:

(a) allocating sufficient memory to hold a plurality of dot profiles, wherein each one of said plurality of dot profiles corresponds to one of a plurality of color planes;

(b) repeatedly generating one of said plurality of single tone levels for each one of said plurality of color planes, by:

(i) determining a quantity of dots needed for one of said plurality of color planes for the present one of said plurality of single tone levels;

(ii) evaluating a numeric decision criterion for a combination of the present one of said plurality of color planes and the present one of said plurality of single tone levels;

(iii) combining said numeric decision criteria for all of said plurality of color planes for the present one of said plurality of single tone levels in a manner such that at least one interlocked "newdot" location is determined in each of said plurality of color planes;

(iv) placing a numeric value corresponding to the present one of said plurality of single tone levels in at least one interlocked "newdot" location in one of said plurality of threshold arrays that correspond to each of said plurality of color planes; and (c) performing steps (b)(i) through (b)(iv) for each of said plurality of single tone levels until all of said tone levels have been generated, thereby completing all entries in said plurality of threshold arrays of color planes.

2. The method as recited in claim 1, wherein each of said plurality of threshold arrays of color planes comprises a stochastic threshold array.

3. The method as recited in claim 1, wherein the step of determining a quantity of dots needed for one of said plurality of color planes for the present one of said plurality of single tone levels comprises the sub-steps of: selecting a value for each of a plurality of variables named "dotsneeded [i]" per each of said plurality of color planes "[i]"; determining if at least one of said plurality of color planes "[i]" requires one of dots to be added {or dots to be removed}; and, if so, determining the exact quantity of dots to be added to {or removed from} the present one of said plurality of single tone levels and for said at least one of said plurality of color planes "[i]".

4. The method as recited in claim 1, wherein during the step of evaluating a numeric decision criterion for a combination of the present one of said plurality of color planes and the present one of said plurality of single tone levels, said numeric decision criterion comprises a minimum density variance statistical approach in generating a dispersed-dot stochastic dither array.

5. The method as recited in claim 1, wherein during the step of combining said numeric decision criteria for all of said plurality of color planes for the present one of said plurality of single tone levels in a manner such that at least one interlocked "newdot" location is determined in each of said plurality of color planes, comprises the sub-steps of: summing the numeric values for the entries of a plurality of intermediate arrays for all of said plurality of color planes after said numeric decision criteria has been applied to the present one of said plurality of color planes and the present one of said plurality of single tone levels, thereby determining at least one minimum array location for placement {or removal} of said interlocked "newdot".

6. The method as recited in claim 5, wherein said numeric values for each intermediate array entry correspond to a combined density sum array.

7. The method as recited in claim 5, wherein the sub-step of summing the numeric values for the entries of a plurality of intermediate arrays for all of said plurality of color planes after said numeric decision criteria has been applied to the present one of said plurality of color planes and the present one of said plurality of single tone levels comprises: taking the weighted average of each of said intermediate array entries for all of said plurality of color planes, thereby generating an interlocked array of numeric values that correspond to array locations each having a numeric value assigned that relates to the desirability of adding an interlocked "newdot" to {or removing interlocked "newdot" from} one of said plurality of color planes for the present one of said plurality of single tone levels.

8. The method as recited in claim 1, wherein for CMYK printing, the color planes that are generated are only for cyan, magenta, and black, and further comprising the step of generating a yellow color plane that is not interlocked with said cyan, magenta, and black color planes.

9. The method as recited in claim 1, wherein for CMYK printing, the color planes that are generated are for cyan, magenta, yellow, and black.

10. The method as recited in claim 1, wherein for CMY printing, the color planes that are generated are only for cyan and magenta, and further comprising the step of generating a yellow color plane that is not interlocked with said cyan and magenta color planes.

11. The method as recited in claim 1, wherein for CMY printing, the color planes that are generated are for cyan and magenta, and yellow.

12. The method as recited in claim 1, wherein for a variable color print job, a first color mode selects from a plurality of sets of threshold arrays, and a second color mode selects from a different one of said plurality of sets of threshold arrays.

13. The method as recited in claim 12, wherein said first color mode selects a black-only threshold array, and said second color mode selects a multi-color set of interlocked threshold arrays.

14. A computer system, comprising: a memory circuit that stores data, and a processing circuit; wherein said processing circuit is configured to create a plurality of interlocked threshold arrays used for halftoning color images, by generating a plurality of single tone levels for a plurality of threshold arrays of color planes, and wherein said processing circuit allocates sufficient space in said memory circuit to hold a plurality of dot profiles, each one of said plurality of dot profiles corresponding to one of a plurality of color planes;

(a) said processing circuit being further configured to repeatedly generate one of said plurality of single tone levels for each one of said plurality of color planes, by:
  (i) determining a quantity of dots needed for one of said plurality of color planes for the present one of said plurality of single tone levels;
  (ii) evaluating a numeric decision criterion for a combination of the present one of said plurality of color planes and the present one of said plurality of single tone levels;
  (iii) combining said numeric decision criteria for all of said plurality of color planes for the present one of said plurality of single tone levels in a manner such that at least one interlocked "newdot" location is determined in each of said plurality of color planes;
  (iv) placing a numeric value corresponding to the present one of said plurality of single tone levels in at least one interlocked "newdot" location in one of said plurality of threshold arrays that correspond to each of said plurality of color planes; and
(b) said processing circuit also being configured to implement steps (a)(i) through (a)(iv) for each of said plurality of single tone levels until all of said tone levels have been generated, thereby completing all entries in said plurality of threshold arrays of color planes.

15. The computer system as recited in claim 14, wherein each of said plurality of threshold arrays of color planes comprises a stochastic threshold array.

16. The computer system as recited in claim 14, wherein said processing circuit, while determining the quantity of dots needed for one of said plurality of color planes for the present one of said plurality of single tone levels, is still further configured to select a value for each of a plurality of variables named "dotsneeded[i]" per each of said plurality of color planes "[i]"; determine if at least one of said plurality of color planes "[i]" requires one of dots to be added {or dots to be removed}; and, if so, then determine the exact quantity of dots to be added to {or removed from} the present one of said plurality of single tone levels and for said at least one of said plurality of color planes "[i]".

17. The computer system as recited in claim 14, wherein said processing circuit, while evaluating the numeric decision criterion for a combination of the present one of said plurality of color planes and the present one of said plurality of single tone levels, is still further configured to use, for said numeric decision criterion, a minimum density variance statistical approach in generating a dispersed-dot stochastic dither array.

18. The computer system as recited in claim 14, wherein said processing circuit, while combining said numeric decision criteria for all of said plurality of color planes for the present one of said plurality of single tone levels in a manner such that at least one interlocked "newdot" location is determined in each of said plurality of color planes, is still further configured to: sum the numeric values for the entries of a plurality of intermediate arrays for all of said plurality of color planes after said numeric decision criteria has been applied to the present one of said plurality of color planes and the present one of said plurality of single tone levels, thereby determining at least one minimum array location for placement {or removal} of said interlocked "newdot".

19. The computer system as recited in claim 18, wherein said numeric values for each intermediate array entry correspond to a combined density sum array.

20. The computer system as recited in claim 18, wherein said processing circuit, while summing the numeric values for the entries of a plurality of intermediate arrays for all of said plurality of color planes after said numeric decision criteria has been applied to the present one of said plurality of color planes and the present one of said plurality of single tone levels, is still further configured to: take the weighted average of each of said intermediate array entries for all of said plurality of color planes, thereby generating an interlocked array of numeric values that correspond to array locations each having a numeric value assigned that relates to the desirability of adding an interlocked "newdot" to or removing interlocked "newdot" from one of said plurality of color planes for the present one of said plurality of single tone levels.

21. The computer system as recited in claim 14, wherein for CMYK printing, the color planes that are generated are only for cyan, magenta, and black, and wherein said processing circuit is still further configured to generate a yellow color plane that is not interlocked with said cyan, magenta, and black color planes.

22. The computer system as recited in claim 14, wherein for CMYK printing, the color planes that are generated are for cyan, magenta, yellow, and black.

23. The computer system as recited in claim 14, wherein for CMY printing, the color planes that are generated are only for cyan and magenta, and wherein said processing circuit is still further configured to generate a yellow color plane that is not interlocked with said cyan and magenta color planes.

24. The computer system as recited in claim 14, wherein for CMY printing, the color planes that are generated are for cyan and magenta, and yellow.

25. The computer system as recited in claim 14, wherein for a variable color print job, a first color mode selects from a plurality of sets of threshold arrays, and a second color mode selects from a different one of said plurality of sets of threshold arrays.

26. The computer system as recited in claim 25, wherein said first color mode selects a black-only threshold array, and said second color mode selects a multi-color set of interlocked threshold arrays.

* * * * *